US011481096B2

(12) United States Patent
Hayward et al.

(10) Patent No.: US 11,481,096 B2
(45) Date of Patent: Oct. 25, 2022

(54) GESTURE MAPPING FOR IMAGE FILTER INPUT PARAMETERS

(71) Applicant: Apple Inc., Cupertino, CA (US)

(72) Inventors: David Hayward, Los Altos, CA (US); Chendi Zhang, Mountain View, CA (US); Alexandre Naaman, Mountain View, CA (US); Richard R. Dellinger, San Jose, CA (US); Giridhar S. Murthy, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/998,590

(22) Filed: Aug. 20, 2020

(65) Prior Publication Data

US 2020/0379634 A1  Dec. 3, 2020

Related U.S. Application Data

(63) Continuation of application No. 16/260,525, filed on Jan. 29, 2019, now Pat. No. 10,788,967, which is a
(Continued)

(51) Int. Cl.
*G06F 3/04845* (2022.01)
*G06F 3/04883* (2022.01)
*G06T 3/00* (2006.01)
*H04N 5/232* (2006.01)
*G06F 3/0488* (2022.01)
(Continued)

(52) U.S. Cl.
CPC ........ *G06F 3/04845* (2013.01); *G06F 3/0488* (2013.01); *G06F 3/04883* (2013.01); *G06T 3/0093* (2013.01); *H04N 5/23216* (2013.01); *G06F 2203/04808* (2013.01);
(Continued)

(58) Field of Classification Search
CPC ............... G06F 3/04845; G06F 3/0488; G06F 3/04883; G06F 2203/04808; H04N 5/23216; H04N 5/2621; H04N 2101/00; G06T 3/0093; G09G 2340/0492
See application file for complete search history.

(56) References Cited

U.S. PATENT DOCUMENTS 6,323,846 B1   11/2001   Westerman et al.
6,570,557 B1   5/2003   Westerman et al.
(Continued)

*Primary Examiner* — Maurice L. McDowell, Jr.
(74) *Attorney, Agent, or Firm* — Invoke

(57) ABSTRACT

This disclosure pertains to systems, methods, and computer readable medium for mapping particular user interactions, e.g., gestures, to the input parameters of various image processing routines, e.g., image filters, in a way that provides a seamless, dynamic, and intuitive experience for both the user and the software developer. Such techniques may handle the processing of both "relative" gestures, i.e., those gestures having values dependent on how much an input to the device has changed relative to a previous value of the input, and "absolute" gestures, i.e., those gestures having values dependent only on the instant value of the input to the device. Additionally, inputs to the device beyond user-input gestures may be utilized as input parameters to one or more image processing routines. For example, the device's orientation, acceleration, and/or position in three-dimensional space may be used as inputs to particular image processing routines.

20 Claims, 21 Drawing Sheets

Related U.S. Application Data continuation of application No. 15/366,469, filed on Dec. 1, 2016, now Pat. No. 10,191,636, which is a continuation of application No. 14/428,041, filed on May 2, 2014, now Pat. No. 9,531,947, which is a continuation of application No. 13/052,994, filed on Mar. 21, 2011, now Pat. No. 8,717,381.

(60) Provisional application No. 61/143,718, filed on Jan. 11, 2011.

(51) Int. Cl.
  *H04N 101/00* (2006.01)
  *H04N 5/262* (2006.01)

(52) U.S. Cl.
  CPC ... *G09G 2340/0492* (2013.01); *H04N 5/2621* (2013.01); *H04N 2101/00* (2013.01)

(56) References Cited

U.S. PATENT DOCUMENTS

| | | | |
|---|---|---|---|
| 6,677,932 B1 | 1/2004 | Westerman | |
| 6,888,536 B2 | 5/2005 | Westerman et al. | |
| 7,479,949 B2 | 1/2009 | Jobs et al. | |
| 7,614,008 B2 | 11/2009 | Bas | |
| 7,649,562 B2* | 1/2010 | Misawa | H04N 5/232933 348/333.01 |
| 7,656,394 B2 | 2/2010 | Westerman et al. | |
| 7,663,607 B2 | 2/2010 | Hotelling et al. | |
| 7,812,826 B2 | 10/2010 | Ording et al. | |
| 7,814,061 B2 | 10/2010 | Kuberka et al. | |
| 7,840,912 B2 | 11/2010 | Elias et al. | |
| 7,844,914 B2 | 11/2010 | Andre et al. | |
| 7,864,163 B2 | 1/2011 | Ording et al. | |
| 8,233,789 B2 | 7/2012 | Brunner | |
| 8,717,381 B2 | 5/2014 | Hayward et al. | |
| 9,531,947 B2 | 12/2016 | Hayward et al. | |
| 10,191,636 B2 | 1/2019 | Hayward et al. | |
| 10,788,967 B2* | 9/2020 | Hayward | H04N 5/23216 |
| 2002/0015024 A1 | 2/2002 | Westerman et al. | |
| 2002/0191029 A1* | 12/2002 | Gillespie | G06F 3/04817 715/810 |
| 2005/0104976 A1 | 5/2005 | Currans | |
| 2005/0108645 A1* | 5/2005 | Prentice | G06F 3/04845 715/722 |
| 2005/0117798 A1 | 6/2005 | Patton et al. | |
| 2005/0174590 A1* | 8/2005 | Kubo | H04N 1/622 358/1.9 |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0033724 A1 | 2/2006 | Chaudhri et al. | |
| 2006/0197753 A1 | 9/2006 | Hotelling | |
| 2007/0257890 A1 | 11/2007 | Hotelling et al. | |
| 2008/0297597 A1* | 12/2008 | Inomata | H04N 5/2354 348/229.1 |
| 2009/0022357 A1 | 1/2009 | Katz | |
| 2009/0073266 A1 | 3/2009 | Abdellaziz et al. | |
| 2009/0077497 A1* | 3/2009 | Cho | G06F 3/0482 715/814 |
| 2009/0146961 A1* | 6/2009 | Cheung | G06F 3/038 345/172 |
| 2009/0202169 A1 | 8/2009 | Hayashi | |
| 2009/0256947 A1* | 10/2009 | Ciurea | G06F 3/04842 348/333.12 |
| 2010/0073303 A1* | 3/2010 | Wu | G06F 3/0488 345/173 |
| 2010/0085303 A1* | 4/2010 | Kwok | G06F 3/0488 345/157 |
| 2010/0149365 A1 | 6/2010 | Ishihara | |
| 2010/0156941 A1* | 6/2010 | Seung | H04N 5/23296 345/660 |
| 2010/0177215 A1* | 7/2010 | Kita | G06T 5/008 348/234 |
| 2011/0019058 A1 | 1/2011 | Sakai et al. | |
| 2011/0074809 A1* | 3/2011 | Chen | G06T 19/00 345/619 |
| 2011/0249961 A1 | 10/2011 | Brunner | |
| 2011/0267526 A1* | 11/2011 | Ishihara | H04N 5/232935 348/E5.022 |
| 2012/0009896 A1* | 1/2012 | Bandyopadhyay | G06F 3/04847 715/764 |
| 2012/0176401 A1 | 7/2012 | Hayward et al. | |
| 2014/0240539 A1 | 8/2014 | Hayward et al. | |
| 2017/0083218 A1 | 3/2017 | Hayward et al. | |

* cited by examiner

GESTURE MAPPING FOR IMAGE FILTER INPUT PARAMETERS

CROSS-REFERENCE TO RELATED APPLICATIONS

Each of the following applications are hereby incorporated by reference: application Ser. No. 16/260,525 filed on Jan. 29, 2019; application Ser. No. 15/366,469 filed on Dec. 1, 2016; application Ser. No. 14/268,041 filed on May 2, 2014; application Ser. No. 13/052,994 filed on Mar. 21, 2011; application No. 61/431,718 filed on Jan. 11, 2011. The Applicant hereby rescinds any disclaimer of claim scope in the parent application(s) or the prosecution history thereof and advises the USPTO that the claims in this application may be broader than any claim in the parent application(s).

BACKGROUND

The disclosed embodiments relate generally to portable electronic devices, and more particularly, to portable electronic devices that display filtered images on a touch screen display.

As portable electronic devices have become more compact, and the number of functions able to be performed by a given device has steadily increased, it has become a significant challenge to design a user interface that allows users to easily interact with such multifunctional devices. This challenge is particularly significant for handheld portable electronic devices, which have much smaller screens than typical desktop or laptop computers.

As such, some portable electronic devices (e.g., mobile telephones, sometimes called mobile phones, cell phones, cellular telephones, and the like) have employed touch-sensitive displays (also known as a "touch screens") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital video recording, web browsing, digital music playing, and/or digital video playing. Instructions for performing these functions may be included in a computer readable storage medium or other computer program product configured for execution by one or more processors.

Touch-sensitive displays can provide portable electronic devices with the ability to present transparent and intuitive user interfaces for viewing and navigating GUIs and multimedia content. Such interfaces can increase the effectiveness, efficiency and user satisfaction with activities like digital photography on portable electronic devices. In particular, portable electronic devices used for digital photography and digital video may provide the user with the ability perform various image processing techniques, such as filtering, focusing, exposing, optimizing, or otherwise adjusting captured images-either in real time as the image frames are being captured by the portable electronic device's image sensor or after the image has been stored in the device's memory.

As image processing capabilities of portable electronic devices continue to expand and become more complex, software developers of client applications for such portable electronic devices increasingly need to understand how the various inputs and states of the device should be translated into input parameters for the image processing routines. As a simple example, consider a single tap gesture at a particular coordinate (x, y) on a touch screen. One example of translating the input point location of (x, y) to an "auto focus" image processing routine would be to cause the coordinate (x, y) to serve as the center of a rectangular box over which the image sensor will attempt to focus for the next captured image frame. With more complex image processing routines, however, such as graphically intensive image filters, the number and type of inputs, as well as logical considerations regarding the orientation of the device and other factors may become too complex for client software applications to readily be able to interpret and/or process correctly.

Accordingly, there is a need for techniques to implement a programmatic interface to map particular user interactions, e.g., gestures, to the input parameters of various image processing routines, e.g., image filters, in a way that provides a seamless, dynamic, and intuitive experience for both the user and the client application software developer.

SUMMARY

As mentioned above, with more complex image processing routines being carried out on personal electronic devices, such as graphically intensive image filters, e.g., image distortion filters, the number and type of inputs, as well as logical considerations regarding the orientation of the device and other factors may become too complex for client software applications to readily interpret and/or process correctly.

As such, in one embodiment described herein, image filters are categorized by their input parameters. For example, circular filters, i.e., image filters with distortions or other effects centered over a particular circular-shaped region of the image, may need input parameters of "input center" and "radius." Thus, when a client application wants to call a particular circular filter, it queries the filter for its input parameters and then passes the appropriate values retrieved from user input (e.g. gestures) and/or device input (e.g., orientation information) to a gesture translation layer, which maps the user and device input information to the actual input parameters expected by the image filter itself. In some embodiments, the user and device input will be mapped to a value that is limited to a predetermined range, wherein the predetermined range is based on the input parameter. Therefore, the client application doesn't need to handle logical operations to be performed by the gesture translation layer or know exactly what will be done with those values by the underlying image filter. It merely needs to know that a particular filter's input parameters are, e.g., "input center" and "radius," and then pass the relevant information along to the gesture translation layer, which will in turn give the image filtering routines the values that are needed to filter the image as indicated by the user, and as will be discussed in further detail below.

In another embodiment, one or more processors in a personal electronic device may receive the selection of image filter(s) to be applied. Next, the device may receive input data from one or more sensors which may be disposed within or upon the device (e.g., image sensor, orientation sensor, accelerometer, Global Positioning System (GPS), gyrometer). Next, the device may receive and register high level events (e.g., gestures) and then use the received device input data and registered event data to pass appropriate input parameters to the selected image filter(s). Finally, the selected image processing routines may be applied, and a filtered image may be returned to the device's display and/or stored to a memory in communication with the device. In some embodiments, the image filter is applied in near-real time, i.e., substantially immediately after the act of passing the appropriate input parameters to the selected image filter occurs.

In yet another embodiment, rather than merely returning a filtered image to the device's display, the device may calculate an image overlay preview grid for the selected image filter(s) and current device input data and gesture inputs. Such an overlay may indicate to the user of the device what inputs are available (e.g., touch, rotation, resizing) and what effect the current settings of the device's inputs will have on the image when the selected image filter(s) are applied.

In still other embodiments, the gesture mapping techniques described above may be applied to video capture as well. Once the device has begun to capture video data, e.g., in the form of a video stream of images, received device input data and registered event data may be used to pass appropriate input parameters to the selected image filter(s) and perform image filtering on the current image frame of the captured video data. As each image frame of video data is captured, the process may optionally store each rendered image frame to memory or merely store the time-tagged sequence of user inputs (e.g. gestures) and/or device inputs (e.g., orientation) that occurred during the video capturing (hereinafter the "gesture track") so that the gesture track may be applied to unfiltered video data at a later date and time, perhaps by a device having a more powerful processor.

In yet another embodiment, face detection algorithms may be employed such that, once the "focus" of an image processing routine, i.e., the central location of the image filter's effect, has been placed on an area of the image determined to be a human face, the focus of the image processing routine will remain over the detected face so long as the detected face remains in the captured image data. For example, if the user of a device employing this embodiment were to indicate via a single tap gesture that a particular subject's face should be the center point, i.e. the "focus," of a particular image processing routine, the subject's face could remain the center point of the image processing routine as that person moved within the captured image data, without the need for the operator of the device to have to continuously click on the subject's face to indicate a new position for the center point of the image processing routine.

Gesture mapping techniques in accordance with the various embodiments described herein may be implemented directly by a device's hardware and/or software, thus making these intuitive and fun image filtering techniques readily applicable to any number of electronic devices, such as mobile phones, personal data assistants (PDAs), portable music players, monitors, televisions, as well as laptop, desktop, and tablet computer systems.

DETAILED DESCRIPTION

Figure 1:
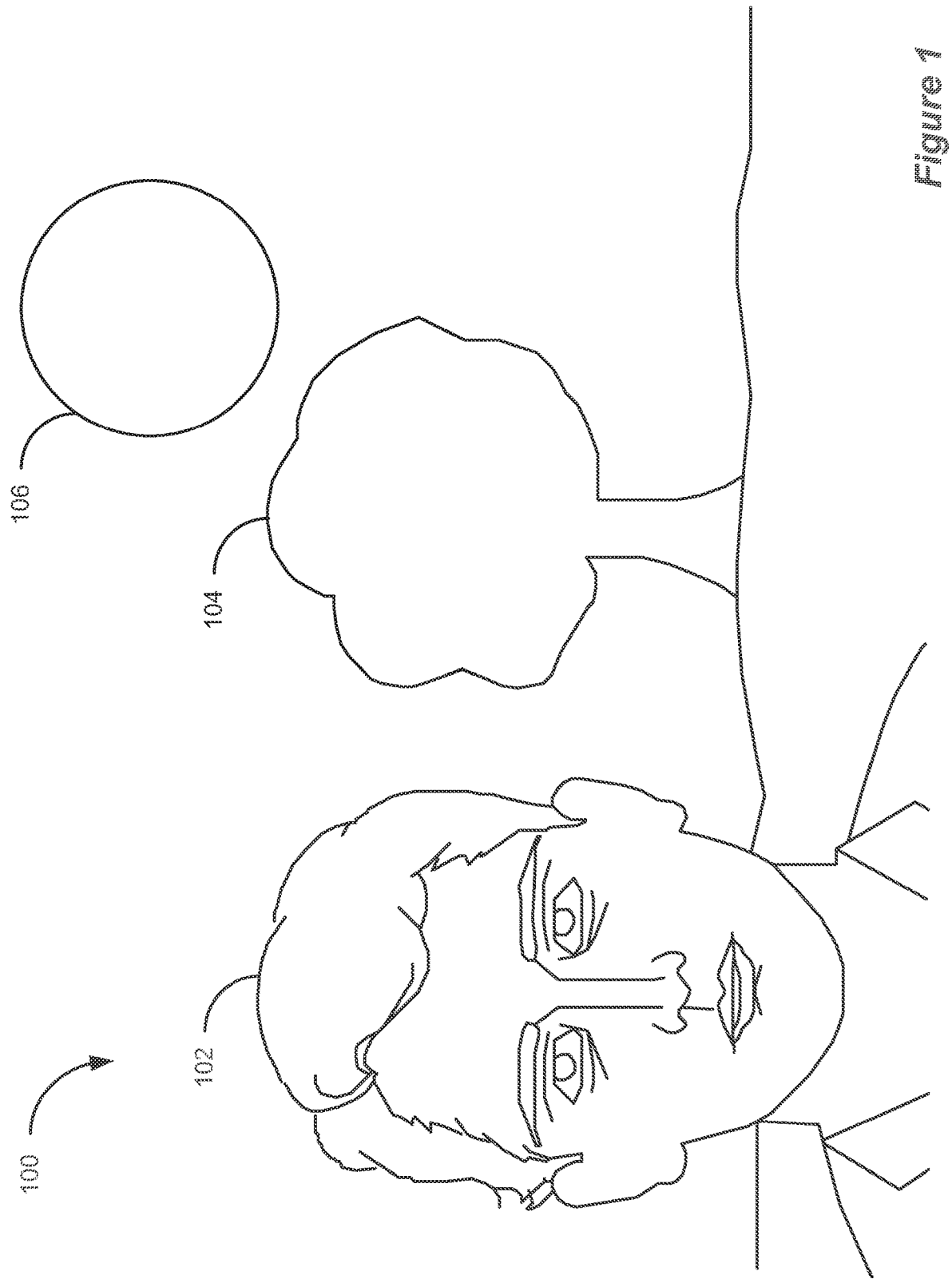
FIG. 1 illustrates a typical outdoor scene with a human subject, in accordance with one embodiment.

This disclosure pertains to systems, methods, and computer readable medium for mapping particular user interactions, e.g., gestures, to the input parameters of various image processing routines, e.g., image filters, in a way that provides a seamless, dynamic, and intuitive experience for both the user and the software developer. Such techniques may handle the processing of both "relative" gestures, i.e., those gestures having values dependent on how much an input to the device has changed relative to a previous value of the input, and "absolute" gestures, i.e., those gestures having values dependent only on the instant value of the input to the device. Additionally, inputs to the device beyond user-input gestures may be utilized as input parameters to one or more image processing routines. For example, the device's orientation, acceleration, and/or position in three-dimensional space may be used as inputs to particular image processing routines.

The techniques disclosed herein are applicable to any number of electronic devices with optical sensors: such as digital cameras, digital video cameras, mobile phones, personal data assistants (PDAs), portable music players, monitors, televisions, and, of course, desktop, laptop, and tablet computer displays.

In the interest of clarity, not all features of an actual implementation are described in this specification. It will of course be appreciated that in the development of any such actual implementation (as in any development project), numerous decisions must be made to achieve the developers' specific goals (e.g., compliance with system- and business-related constraints), and that these goals will vary from one implementation to another. It will be appreciated that such development effort might be complex and time-consuming, but would nevertheless be a routine undertaking for those of ordinary skill having the benefit of this disclosure.

In the following description, for purposes of explanation, numerous specific details are set forth in order to provide a thorough understanding of the inventive concept. As part of the description, some structures and devices may be shown in block diagram form in order to avoid obscuring the invention. (In addition, references to numbers without subscripts are understood to reference all instances of subscripts corresponding to the referenced number.) Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Referring now to FIG. 1, a typical outdoor scene 100 with a human subject 102 is shown, in accordance with one embodiment. The scene 100 also includes the Sun 106 and a natural object, tree 104. Scene 100 will be used in the subsequent figures as an exemplary scene to illustrate the various image processing techniques described herein.

Figure 2:
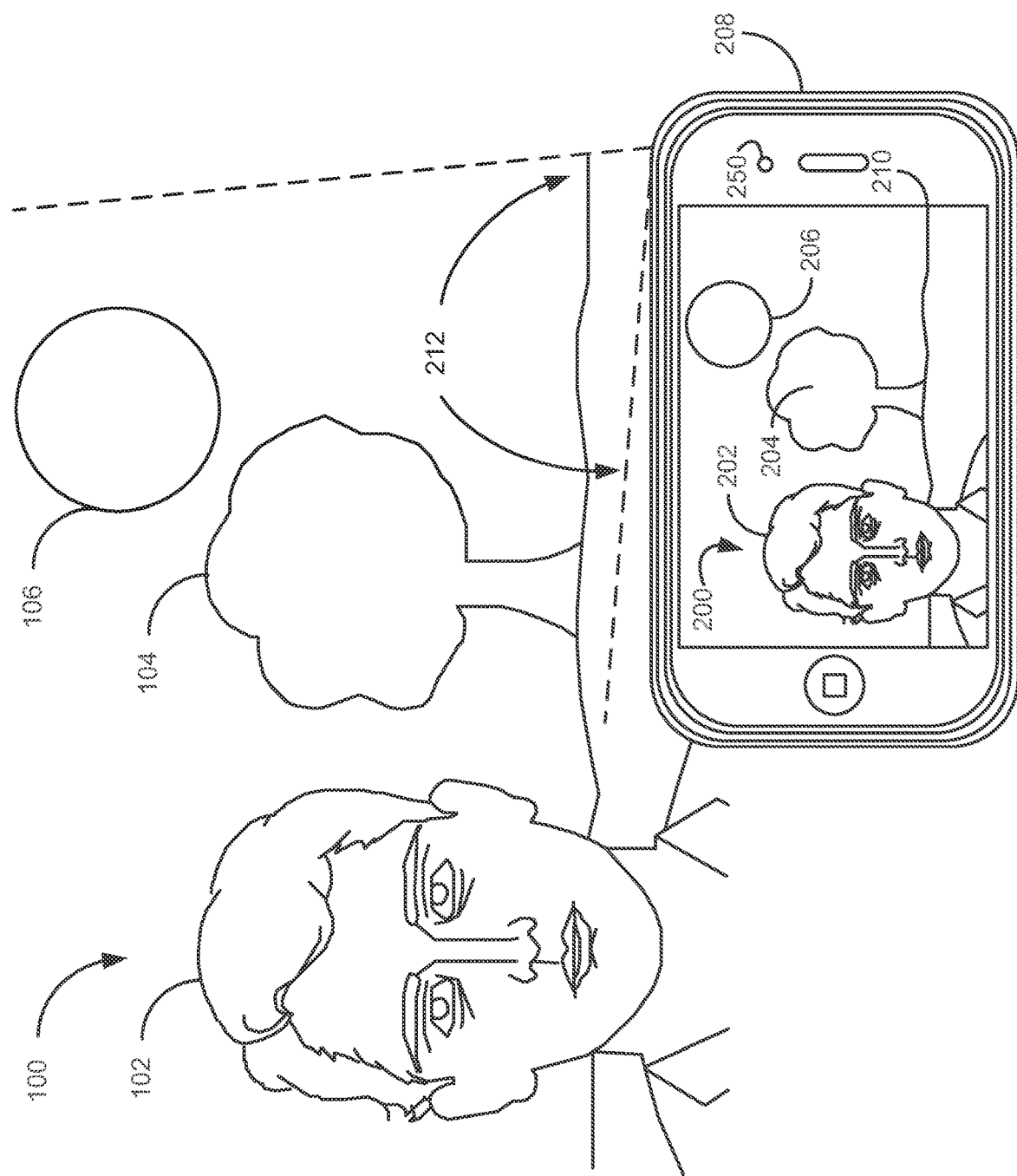
FIG. 2 illustrates a typical outdoor scene with a human subject as viewed on a camera device's preview screen, in accordance with one embodiment.

Referring now to FIG. 2, a typical outdoor scene 200 with a human subject 202 as viewed on a camera device 208's preview screen 210 is shown, in accordance with one embodiment. The dashed lines 212 indicate the viewing angle of the camera (not shown) on the reverse side of camera device 208. Camera device 208 may also possess a second camera, such as front-facing camera 250. Other numbers and positions of cameras on camera device 208 are also possible. As mentioned previously, although camera device 208 is shown here as a mobile phone, the teachings presented herein are equally applicable to any electronic device possessing a camera, such as, but not limited to: digital video cameras, personal data assistants (PDAs), portable music players, laptop/desktop/tablet computers, or conventional digital cameras. Each object in the scene 100 has a corresponding representation in the scene 200 as viewed on a camera device 208's preview screen 210. For example, human subject 102 is represented as object 202, tree 104 is represented as object 204, and Sun 106 is represented as object 206.

Figure 3:
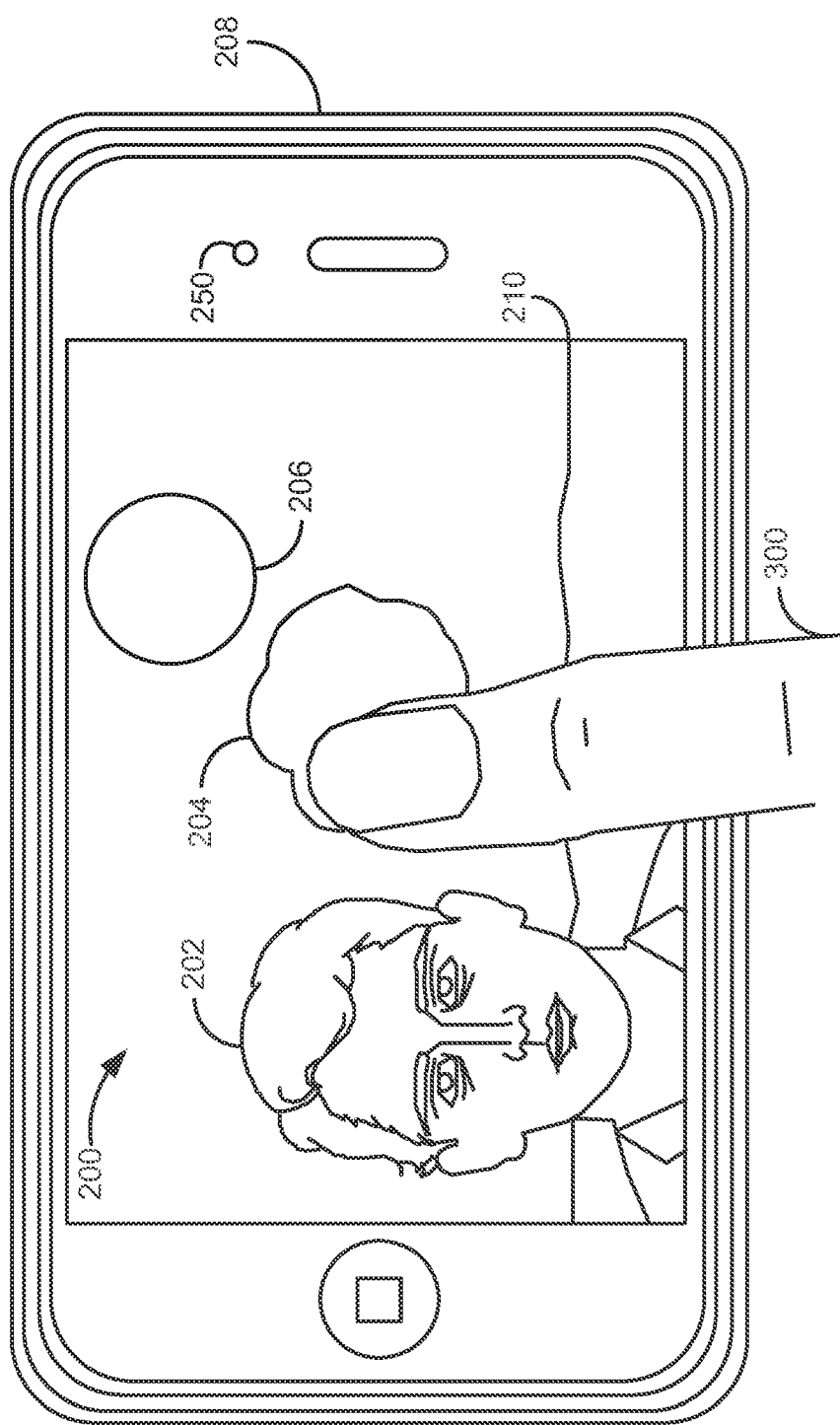
FIG. 3 illustrates a user interacting with a camera device via a touch gesture, in accordance with one embodiment.

Referring now to FIG. 3, a user 300 interacting with a camera device 208 via an exemplary touch gesture is shown, in accordance with one embodiment. The preview screen 210 of camera device 208 may be, for example, a touch screen. The touch-sensitive touch screen 210 provides an input interface and an output interface between the device 208 and a user 300. The touch screen 210 displays visual output to the user. The visual output may include graphics, text, icons, pictures, video, and any combination thereof.

A touch screen such as touch screen 210 has a touch-sensitive surface, sensor or set of sensors that accepts input from the user based on haptic and/or tactile contact. The touch screen 210 detects contact (and any movement or breaking of the contact) on the touch screen 210 and converts the detected contact into interaction with user-interface objects (e.g., one or more soft keys, icons, web pages, images or portions of images) that are displayed on the touch screen. In an exemplary embodiment, a point of contact between a touch screen 210 and the user corresponds to a finger of the user 300.

The touch screen 210 may use LCD (liquid crystal display) technology, or LPD (light emitting polymer display) technology, although other display technologies may be used in other embodiments. The touch screen 210 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 210.

A touch-sensitive display in some embodiments of the touch screen 210 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. A touch-sensitive display in some embodiments of the touch screen 210 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein.

The touch screen 210 may have a resolution in excess of 300 dots per inch (dpi). In an exemplary embodiment, the touch screen has a resolution of approximately 325 dpi. The user 300 may make contact with the touch screen 210 using any suitable object or appendage, such as a stylus, a finger, and so forth. In some embodiments, the user interface is designed to work primarily with finger-based contacts and gestures, which typically have larger areas of contact on the touch screen than stylus-based input. In some embodiments, the device translates the rough finger-based gesture input into a precise pointer/cursor coordinate position or command for performing the actions desired by the user 300.

As used herein, a gesture is a motion of the object/appendage making contact with the touch screen display surface. One or more fingers may be used to perform two-dimensional or three-dimensional operations on one or more graphical objects presented on preview screen 210, including but not limited to: magnifying, zooming, expanding, minimizing, resizing, rotating, sliding, opening, closing, focusing, flipping, reordering, activating, deactivating and any other operation that can be performed on a graphical object. In some embodiments, the gestures initiate operations that are related to the gesture in an intuitive manner. For example, a user can place an index finger and thumb on the sides, edges or corners of a graphical object and perform a pinching or anti-pinching gesture by moving the index finger and thumb together or apart, respectively. The operation initiated by such a gesture results in the dimensions of the graphical object changing. In some embodiments, a pinching gesture will cause the size of the graphical object to decrease in the dimension being pinched. In some embodiments, a pinching gesture will cause the size of the graphical object to decrease proportionally in all dimensions. In some embodiments, an anti-pinching or de-pinching movement will cause the size of the graphical object to increase in the dimension being anti-pinched. In other embodiments, an anti-pinching or de-pinching movement will cause the size of a graphical object to increase in all dimensions (e.g., enlarging proportionally in the x and y dimensions).

Figure 4:
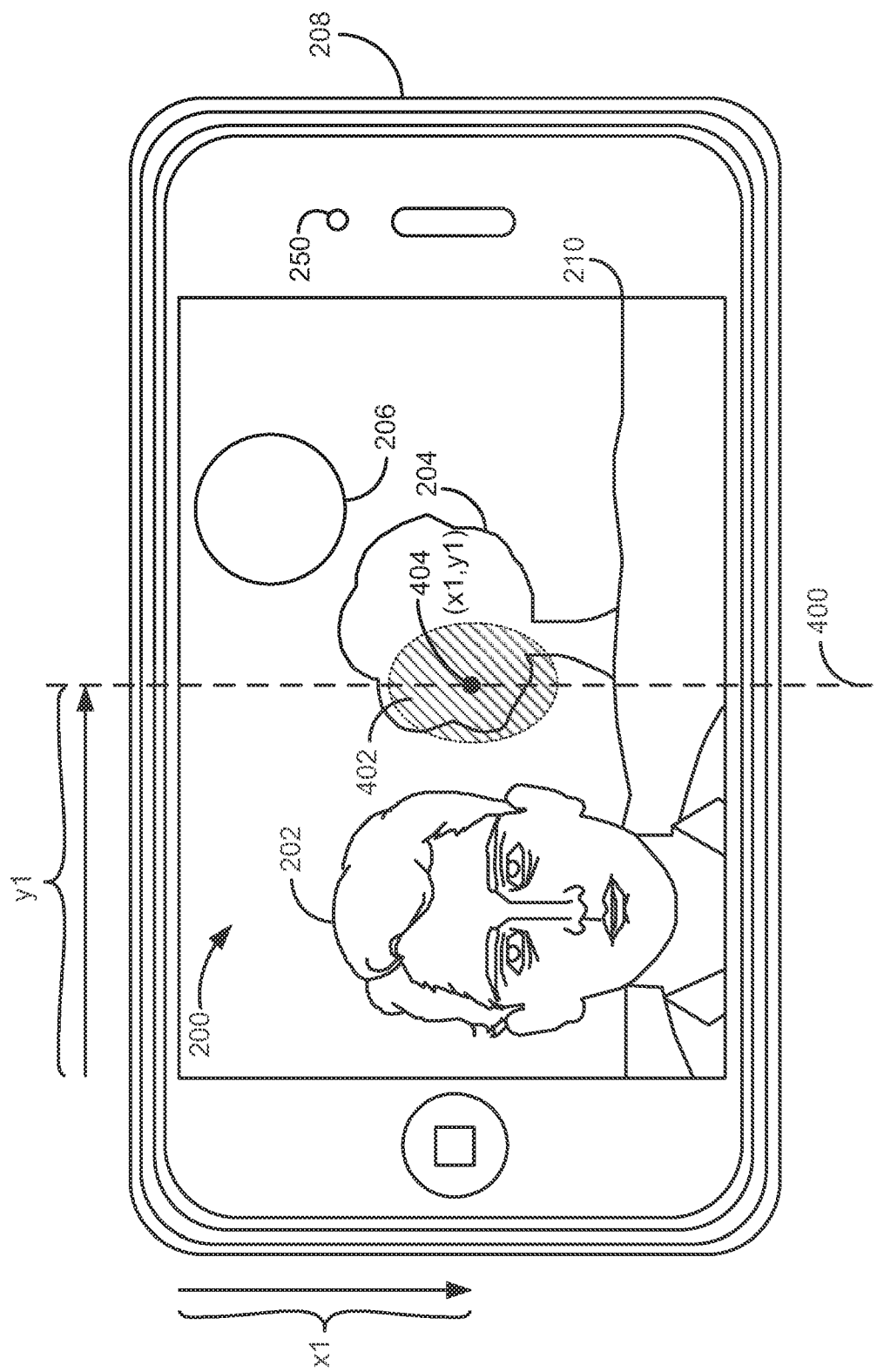
FIG. 4 illustrates a user tap point on a touch screen of a camera device in "landscape orientation," in accordance with one embodiment.

Referring now to FIG. 4, a user tap point 402 on a touch screen 210 of a camera device 208 positioned in "landscape" orientation is shown, in accordance with one embodiment. The location of tap point 402 is represented by an oval shaded with diagonal lines. As mentioned above, in some embodiments, the device translates finger-based tap points into a precise pointer/cursor coordinate position, represented in FIG. 4 as point 404 with coordinates x1 and y1. As shown in FIG. 4, the x-coordinates of the device's display correspond to the shorter dimension of the display, and the y-coordinates correspond to the longer dimension of the display. Axis 400, whose location is defined by the y-coordinate, y1, of point 404 may be used in the application of a particular image distortion filter, for example a mirroring distortion effect, as will be described in further detail below.

In some embodiments, the user-input gestures to device 208 may be used to drive the setting of input parameters of various image processing routines, such as image filters, e.g., image distortion filters. The above functionality can be realized with an input parameter gesture mapping process. The process begins by detecting N contacts on the display surface 210. When N contacts are detected, information such as the location, duration, size, and rotation of each of the N contacts is collected by the device. The user is then allowed to adjust the input parameters by making or modifying a gesture at or near the point of contact. If motion is detected, the input parameters may be adjusted based on the motion. For example, the central point, or "focus," of an exemplary image distortion filter may be animated to simulate the motion of the user's finger and to indicate to the user that the input parameter, i.e., the central point of the image distortion filter, is being adjusted in accordance with the motion of the user's finger.

If one or more of the N contacts is lost, then the current value or state of the parameter may be saved and a timer may be started. If the timer exceeds a threshold time before contact is reestablished then the current values of the input parameter may be saved. If contact is reestablished before the timer exceeds the threshold time, the user may be able to continue adjusting the input parameter from its last value computed during operation.

When adjusting an input parameter (such as the central point or radius of a circular image filter) of an image filter, there may be a scenario where the user intentionally loses contact with the display surface 210. For example, the user may wish to adjust the parameter by making a multi-touch gesture two or more times. The gesture may include repetitive motions, such as rotation or de-pinching (where the user makes contact with his or her fingers close together and then moves them apart). For example, the user may make contact, perform the gesture, break contact, make contact again, and perform the gesture again. Such a sequence may be repeated multiple times. The adjustment of the image filter input parameter may be in accordance with the gesture. In some embodiments, operations corresponding to such repeated gestures may be applied or used to modify the image filter input parameter if an elapsed time between breaking contact and making contact again is less than a pre-determined value or time interval.

In some embodiments, the input parameter's change in magnitude may be a nonlinear function of the magnitude of the input gesture, e.g., an exponential function. For example, the input parameter's change may be an exponential function of the rotation, swipe, and/or de-pinching gesture. This may allow the user to modify the input parameter without making multiple gestures or by using fewer gestures than would otherwise be needed with a linear variation of the parameter as a function of the displacement of the N contacts during the gesture.

In some embodiments, the image may comprise both a high-resolution version and a low-resolution version, and, to improve processing efficiency, the act of applying the image filter to the image may comprise applying the image filter to both the high-resolution and low-resolution versions of the image, wherein the act of applying the image filter to the high-resolution version of the image is performed by a CPU (central processing unit) of the electronic device, and wherein the act of applying the image filter to the low-resolution version of the image is performed by a GPU (graphics processing unit) of the electronic device.

While the input parameter adjustment process described above includes a number of operations that appear to occur in a specific order, it should be apparent that these processes can include more or fewer steps or operations, which can be executed serially or in parallel (e.g., using parallel processors or a multi-threading environment).

As mentioned above, the location of touch point 402, as defined by point 404 having coordinates x1 and y1, may be used by a particular image distortion filter, e.g., a mirroring distortion filter, to define axis 400. With device 208 positioned in landscape orientation, as shown in FIG. 4, the location of axis 400 may be defined by the y-coordinate, y1, of point 404. If instead, the device 208 is positioned in portrait orientation, as will be shown in FIGS. 8-9, the location of axis 400 may be defined by the x-coordinate of the user touch point. The mirroring distortion filter is just one example of an image filter where the client calling application would only need to send device input information (i.e., the coordinates of the user touch point and the orientation of the device) to the gesture translation layer (discussed below in reference to FIG. 12) for the mirroring image distortion to be applied and would not need to understand the underlying logic to be applied by the image distortion filter, such as taking axis location and device orientation into account when applying the image filter.

Figure 5:
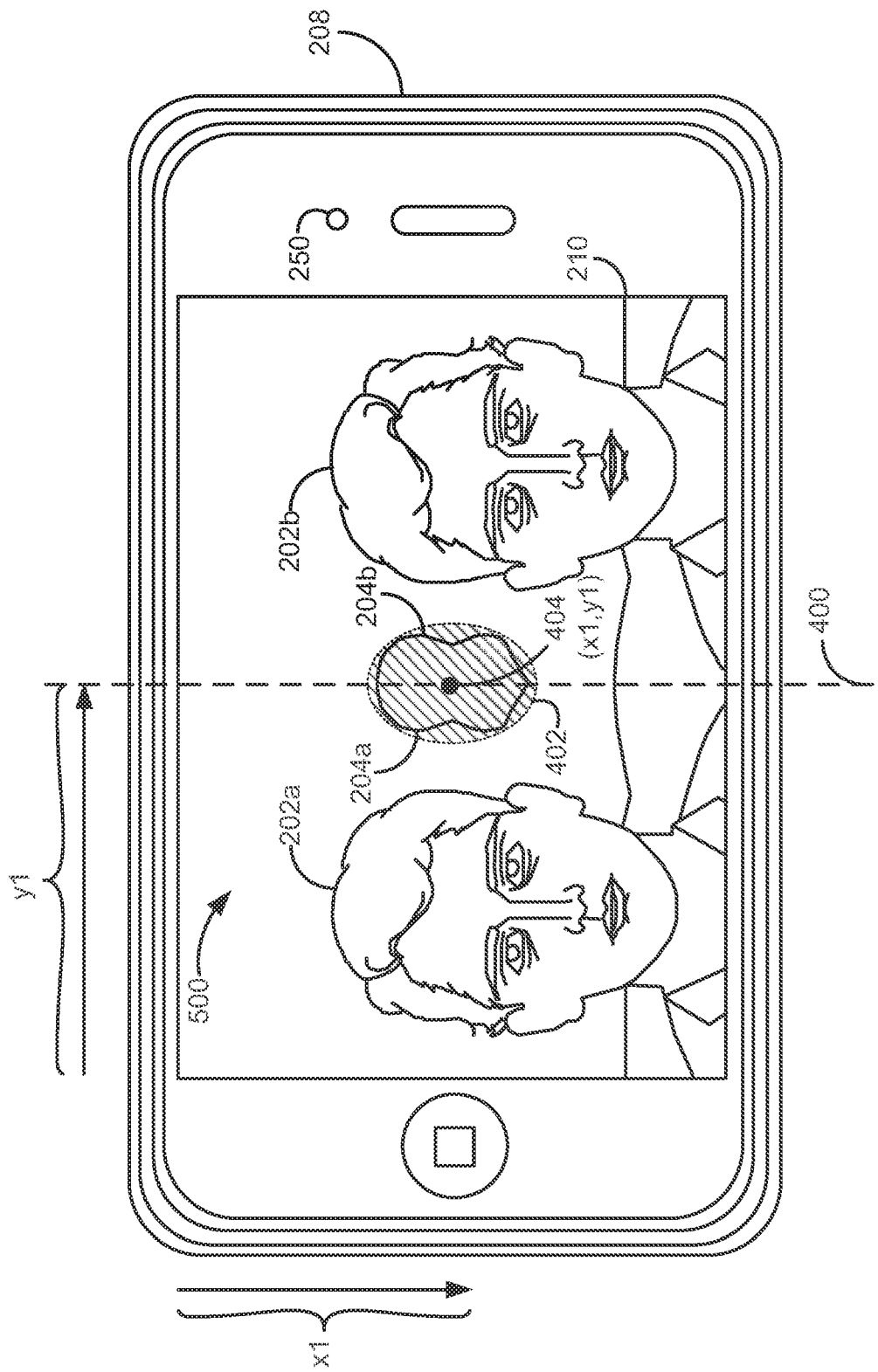
FIG. 5 illustrates a mirroring image filter in landscape orientation based on a user tap point on a touch screen of a camera device, in accordance with one embodiment.

Referring now to FIG. 5, a mirroring image distortion filter in landscape orientation based on a user tap point 402 on a touch screen 210 of a camera device 208 is shown, in accordance with one embodiment. As described above, axis 400 serves as the mirroring axis for this distortion, and its location is based on the location of user tap point 402 in the direction of the y-axis of the phone. In this exemplary embodiment of a mirroring distortion filter, the left hand side of the image is mirrored over to the right hand side of the device's display screen, although such a choice is not strictly necessary. As is shown in mirrored scene 500, human subject 202a originally found on the left hand side of the image is now mirrored in the form of human subject 202b onto the right hand side of the image. Likewise, the left hand side 204a of tree 204 is mirrored onto the right hand side of the image in the form of 204b and the trunk of tree 204 from original scene 200 is no longer visible in the distorted image as displayed on touch screen 210.

Figure 6:
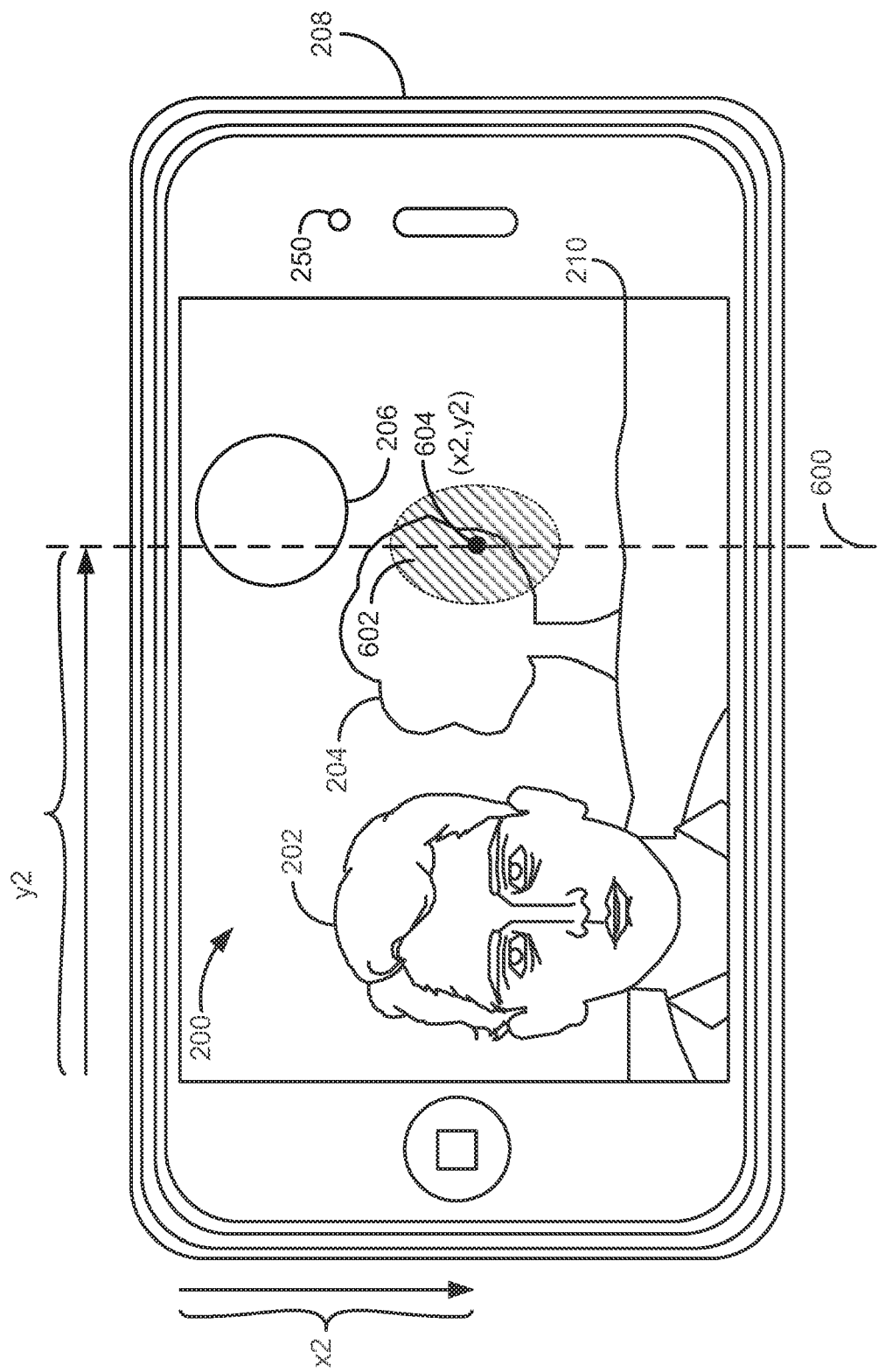
FIG. 6 illustrates a user tap point on a touch screen of a camera device, in accordance with another embodiment.

Referring now to FIG. 6, a user tap point 602 on a touch screen 210 of a camera device 208 positioned in "landscape" orientation is shown, in accordance with another embodiment. As described above, touch point 602 may be defined by point 604 having coordinates x2 and y2, which coordinates may be used by the mirroring distortion filter to define axis 600. When compared with FIGS. 4-5, the value of y2 is greater than y1, indicating that the user tapped the touch screen of the device farther to the right hand side of the screen. Thus, in the embodiment shown in FIG. 6, the mirroring image distortion filter will be applied about axis 600.

Figure 7:
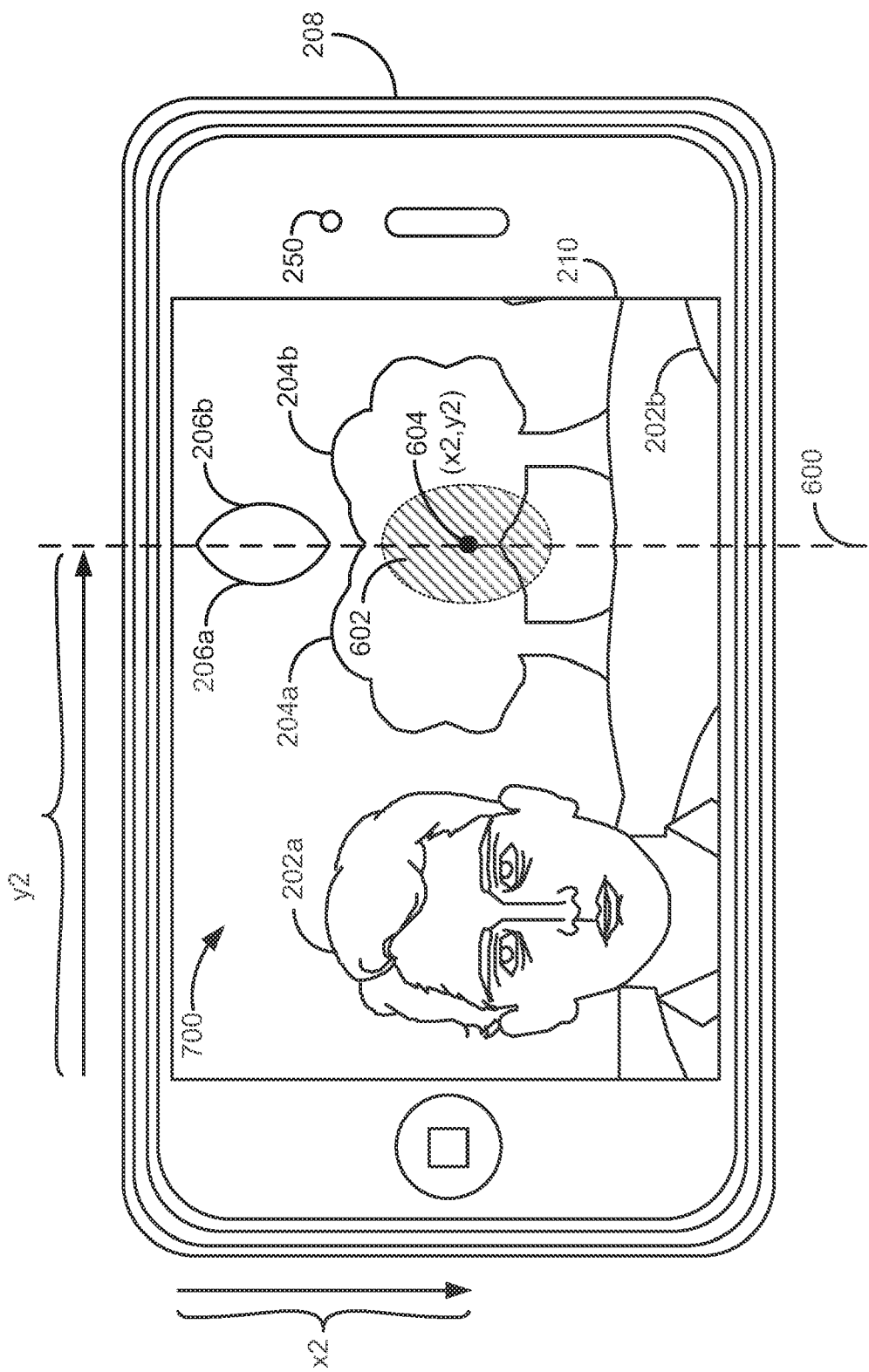
FIG. 7 illustrates a mirroring image filter in landscape orientation based on a user tap point on a touch screen of a camera device, in accordance with one embodiment.

Referring now to FIG. 7, a mirroring image distortion filter in landscape orientation based on a user tap point 602 on a touch screen 210 of a camera device 208 is shown, in accordance with one embodiment. As described above, axis 600 serves as the mirroring axis for this distortion, and its location is based on the location of user tap point 602 in the direction of the y-axis of the phone. In this exemplary embodiment of a mirroring distortion filter, the left hand side of the image is mirrored over to the right hand side of the device's display screen, although such a choice is not strictly necessary. As is shown in mirrored scene 700, human subject 202a originally found on the left hand side of the image is now mirrored in the form of human subject 202b onto the right hand side of the image, though only a small portion of human subject 202b is seen on the right hand side of the image. Likewise, the left hand sides 204a of tree 204 and 206a of Sun 206 are mirrored onto the right hand side of the image in the form of 204b and 206b in the distorted image as displayed on touch screen 210.

Figure 8:
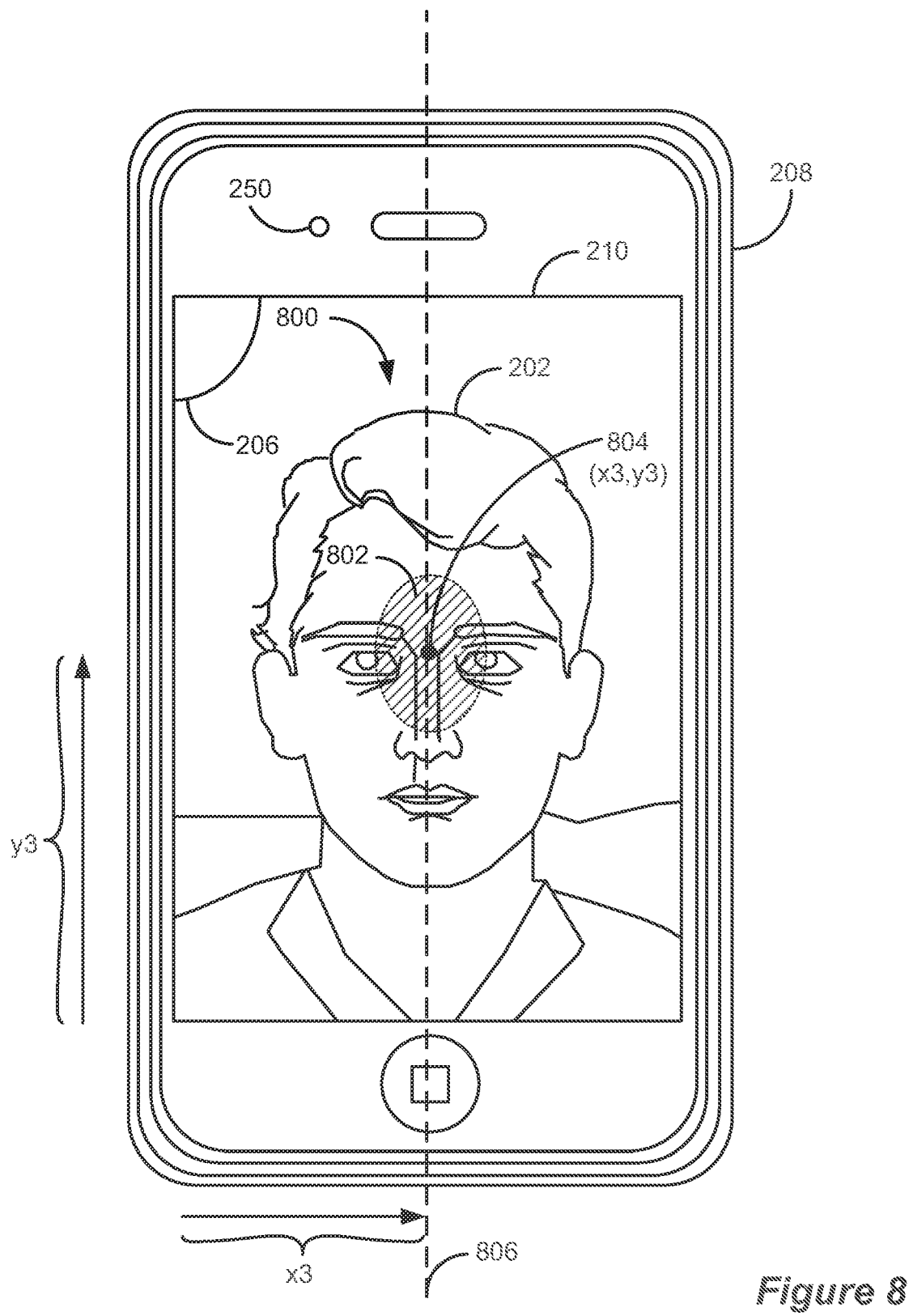
FIG. 8 illustrates a user tap point on a touch screen of a camera device in "portrait orientation," in accordance with one embodiment.

Referring now to FIG. 8, a user tap point 802 on a touch screen 210 of a camera device 208 positioned in "portrait" orientation is shown, in accordance with another embodiment. As described above, touch point 802 may be defined by point 804 having coordinates x3 and y3, which coordinates may be used by the mirroring distortion filter to define mirroring axis 806. When compared with FIGS. 4-7, the mirroring axis 806 in FIG. 8 is determined to be defined by the position of the x-coordinate of the touch point rather than the y-coordinate of the touch point because the device is positioned in portrait orientation, and the particular image filter being described herein still desires that the mirroring distortion mirrors the left hand side of the image to the right hand side of the image. As can be understood more clearly with reference to FIG. 8, were the mirroring distortion filter not to take the device's orientation into account, the mirroring axis would still be defined by the y-coordinate of the touch point, and would have the effect of mirroring the bottom half of scene 800 to the top half of scene 800.

Figure 9:
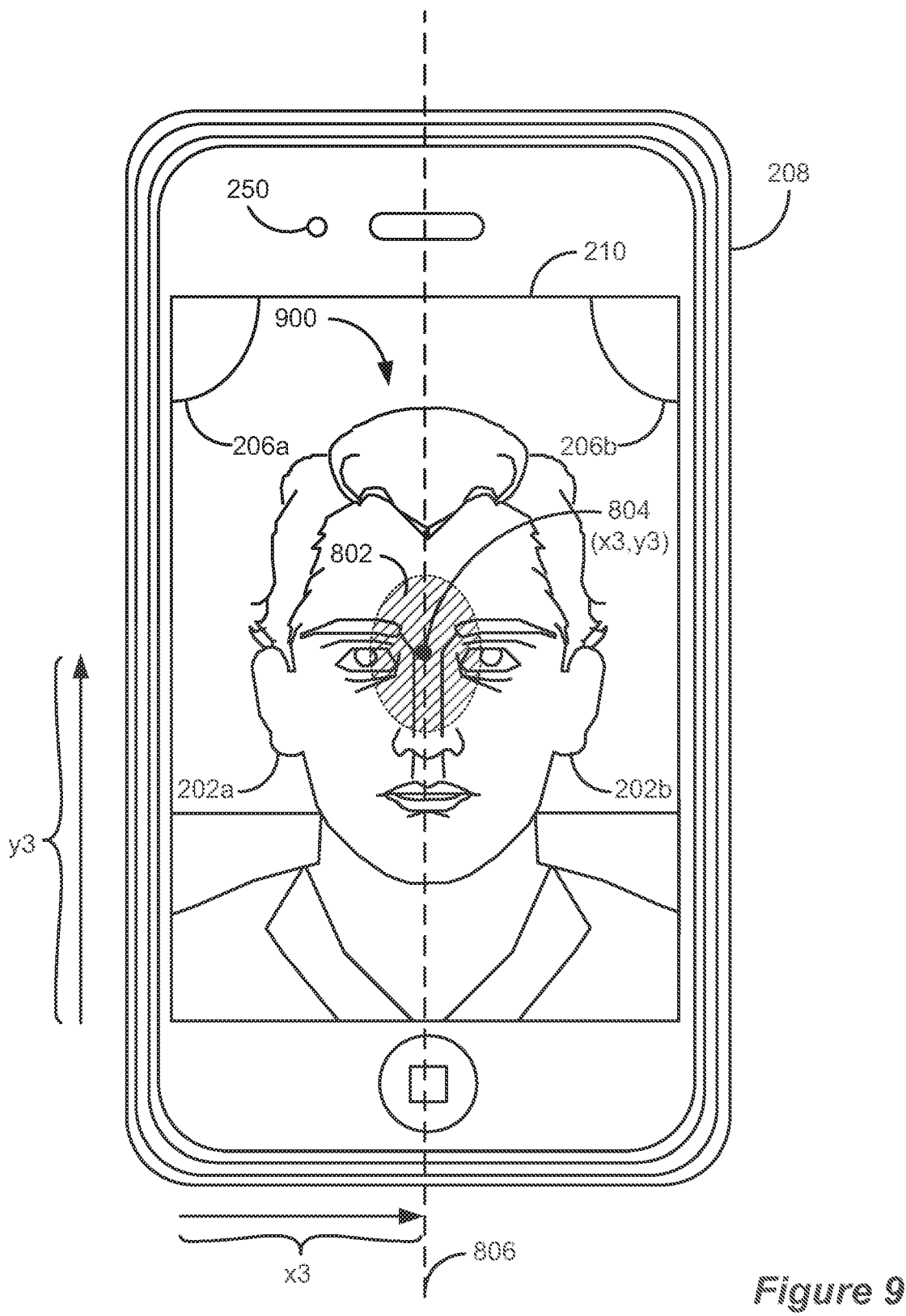
FIG. 9 illustrates a mirroring image filter in portrait orientation based on a user tap point on a touch screen of a camera device, in accordance with one embodiment.

Referring now to FIG. 9, a mirroring image distortion filter in portrait orientation based on a user tap point 802 on a touch screen 210 of a camera device 208 is shown, in accordance with one embodiment. As described above, axis 806 serves as the mirroring axis for this distortion, and its location is based on the location of user tap point 802 in the direction of the x-axis of the phone. In this exemplary embodiment of a mirroring distortion filter, the left hand side of the image is mirrored over to the right hand side of the device's display screen, although such a choice is not strictly necessary. As is shown in mirrored scene 900, the left half of human subject 202a's face is now mirrored in the form of human subject 202b onto the right hand side of the image, and the actual right hand side of human subject 202's face seen in scene 800 of FIG. 8 is no longer visible. Likewise, a depiction of Sun 206, originally on the left hand side of scene 800, now appears on both the left hand side 206a and the right hand side 206b of the distorted image as displayed on touch screen 210.

Relative v. Absolute Gestures

As mentioned above, and as used herein, "relative" gestures refers to those gestures having values dependent on how much an input to the device has changed relative to a previous value of the input, whereas "absolute" gestures refers to those gestures having values dependent only on the instant value of the input to the device.

For example, the selection of a mirroring axis for the mirroring distortion image filter described above in reference to FIGS. 4-9 would be considered an "absolute gesture" since the location of the mirroring axis immediately "snaps to" the location at which the user taps on the touch screen. If the user were to swipe his or her finger across the touch screen with the mirroring distortion filter selected, the mirroring axis would track the location of the user's touch point. Likewise, other absolute gestures, as will be described in further detail below, will assign values to the input parameters of image filters based on the instantaneous and absolute location of the user's interaction with respect to the touch screen. Absolute gestures may tend to work well with image filters having a central point or "focus" of the image filtering effect, such as a "twirl" effect that twirls the image data within a circular region within the image. In some embodiments, the location of the central point or "focus" of an image filtering effect that is responding to absolute gestures may be animated from its previous location to its current location to avoid any potentially visually jarring effects as the focus of the image filter "jumps" from location to location. In one embodiment, the focus of the image filter effect may animate over a duration of 0.5 seconds to its new location. Additionally, the focus point may accelerate into and/or out of its movements to provide for a smoother and less jarring visual presentation to the user. In other embodiments, an absolute gesture may be configured with maximum and minimum effect limits so that the image filtering effect can neither become so small that the user can't perceive it, nor can it become so large that no part of the original, i.e., undistorted, image can be perceived.

"Relative" gestures, on the other hand, may be better suited to image filters whose input is not based on the user's selection of, or interaction with, a particular portion of the image indicating a location where the user desires the image filtering effect to be centered or focused. For example, image filters that adjust the image's hue, contrast, or brightness may be well-suited for relative gestures because their effects are less dependent on where in the image the user interacts. That is, filters that don't relate to a particular "physical center" of the image may be well-suited to relative gestures. For example, one relative gesture could be configured such that, for every ten pixels that a user dragged an initial tap location, the brightness of the image either increased or decreased by 20%, depending on the direction of movement. By building such multiplier effects into relative gestures, it will be possible for relative gestures to have a greater effect on the input parameter that the physical size of the preview screen would otherwise allow. Such relative gestures could also implement flicks, i.e., provide inertia to the setting of the input parameter based on the intensity and acceleration with which the user swiped the display. Additionally, such input parameters responsive to relative gestures could accelerate into and/or out of value changes so as to avoid any potentially visually jarring effects on the device's display.

Further, and as will be explained below in reference to FIG. 11, with relative gestures, the device may not need to account for whether or not the image being displayed on the device's display is actually a mirrored image of the "real world," e.g., the image being displayed on the device is often mirrored when a front-facing camera such as front-facing camera 250 is being used to drive the device's display.

In accordance with one embodiment described herein, an image filter may request whether it wants to be passed absolute gestures or relative gestures, which logic may be handled by the gesture translation layer (discussed below in reference to FIG. 12), so that the calling client application does not have to handle logic for both types of gestures.

Figure 10A:
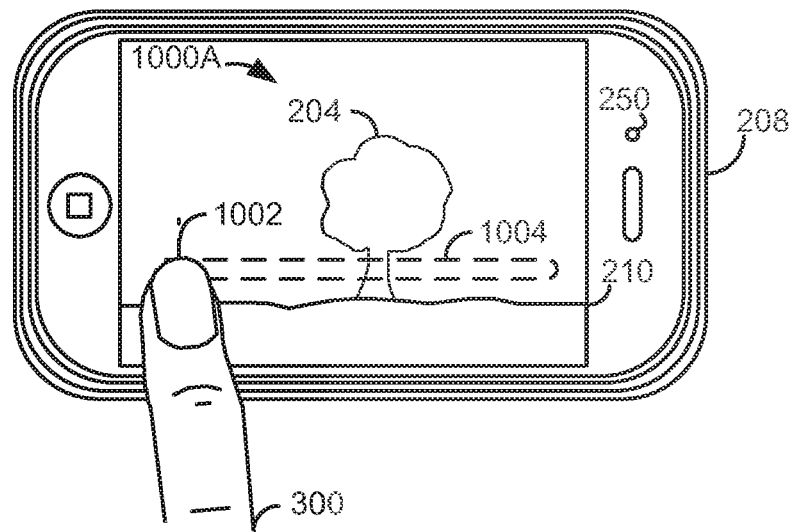
FIGS. 10A-10C illustrate the input of a relative gesture, in accordance with one embodiment.
Figure 10B:
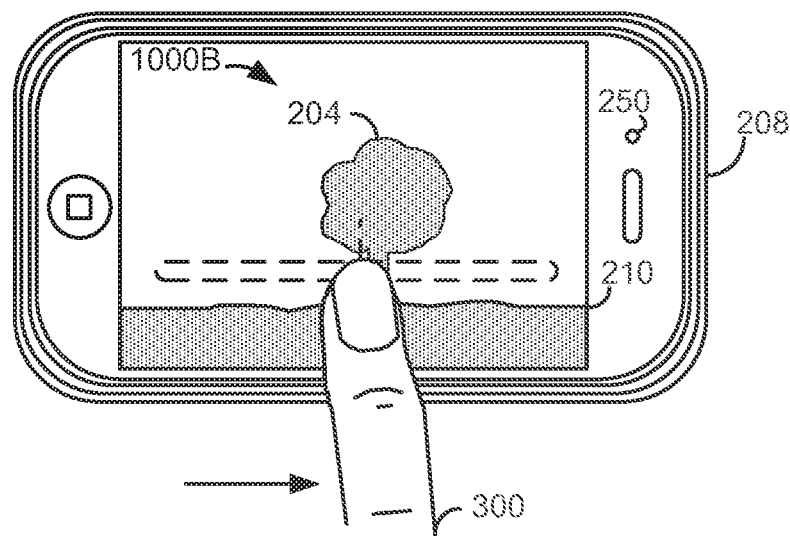
Figure 10C:
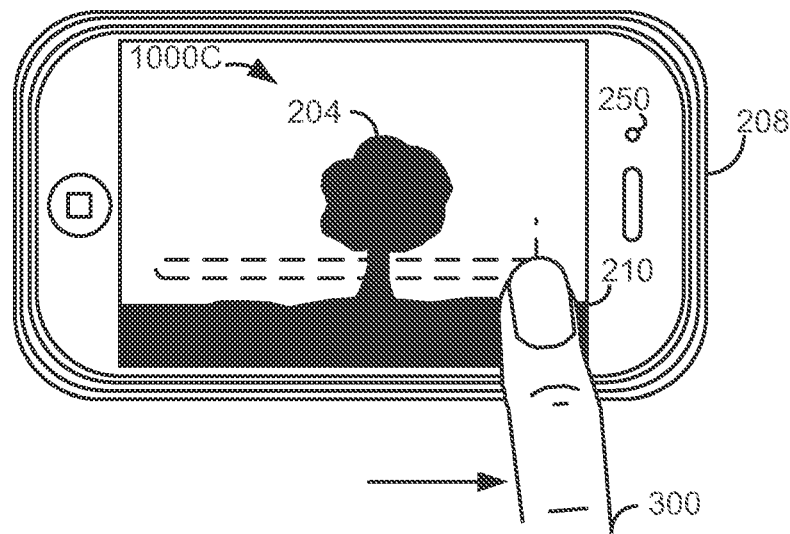

Referring now to FIGS. 10A-10C, the input of an exemplary relative gesture is shown, in accordance with one embodiment. As illustrated in FIGS. 10A-10C, relative gestures input by user 300 may drive the input parameter to an image filter that simply adjusts image contrast to be higher or lower than its current setting. As shown in FIG. 10A, scene 1000A comprising tree 204 has low levels of contrast between the tree 204 and the background sky. In FIG. 10A, the finger of user 300 initiates a touch gesture with the left hand side of touch screen 210. As FIGS. 10A-10C are meant to illustrate a relative gesture, the location that the user 300 selects for his or her initial contact with the touch screen is not important to the determination of the value that will ultimately be sent to the input parameter of the selected image contrast image filer. As such, logical slider 1004 is shown in dashed lines on device 208 with logical handle 1002 also shown in dashed lines on device 208 and representing the current location of the user 300's finger with respect to where the gesture was initiated. As shown in FIG. 10B, the user 300's finger has moved roughly halfway across the width of touch screen 210, and, accordingly, scene 1000B comprising tree 204 shows a higher level of contrast between the tree 204 and the background sky than scene 1000A. As shown in FIG. 10C, the user 300's finger has moved all the way to the right hand side of touch screen 210, indicating that the user wishes the image filter to apply the maximum allowable amount of contrast to the captured image data, and, accordingly, scene 1000C comprising tree 204 shows the highest level of contrast between the tree 204 and the background sky, when compared to scenes 1000A and 1000B.

As FIGS. 10A-10C are illustrative of an exemplary relative gesture, it is interesting to note that, if user 300 had initially started his or her finger in the position of the finger in FIG. 10B, and then moved the finger to the position of the finger as shown in FIG. 10C, the amount of change in image contrast would be equivalent to the amount of change shown between FIGS. 10A and 10B. In other words, the amount of change in the input parameter caused by the gesture is not tied to any "absolute" location of the input gesture on the preview screen; rather, the effect on the input parameter is "relative" to the amount of change in the input gesture from its initial location. Image filters responsive to such relative gestures may employ an (h, v) coordinate system (i.e., horizontal/vertical) for their input parameters as opposed to the (x, y) coordinate system described above with reference to absolute gestures. The (h, v) coordinate system may be applied when, for example, the image filter doesn't relate to a particular "physical location" in the image or when a gesture is indicative of a desire to adjust an input parameter logically 'left' or 'right' regardless of whether the image being displayed on the device is currently being mirrored or translated in some other way from how it was originally captured by the image sensor.

Figure 11:
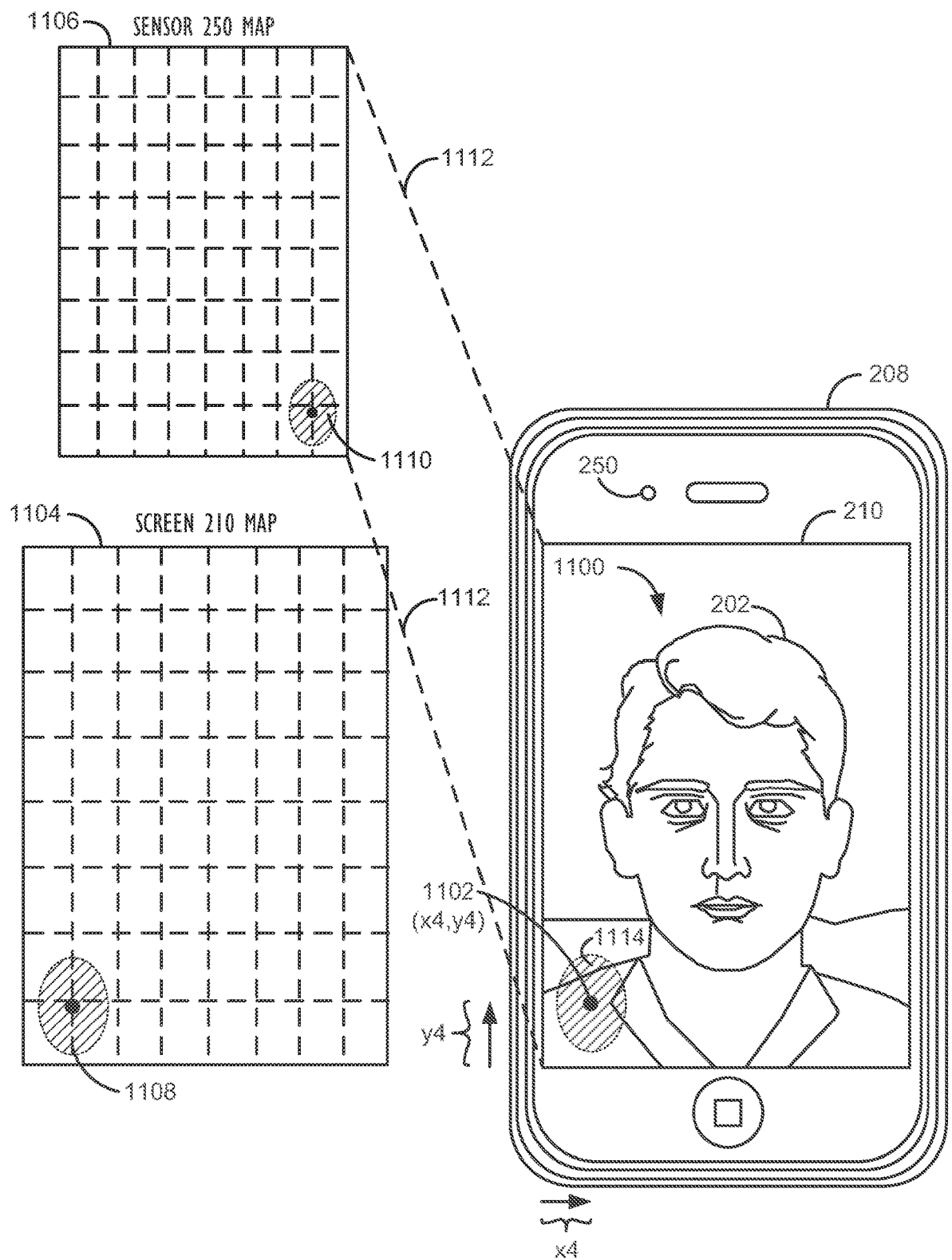
FIG. 11 illustrates the translation of a gesture from touch screen space to image sensor space, in accordance with one embodiment.

Referring now to FIG. 11, the translation of a gesture from "touch screen space" to "image sensor space" is shown, in accordance with one embodiment. As mentioned above, with certain gestures, the device may not need to account for whether or not the image being displayed on the device's display is actually a mirrored or otherwise translated image of the "real world," e.g., the image being displayed on the device is often mirrored when a front-facing camera such as front-facing camera 250 is being used to drive the device's display. In instances where the image being displayed on the device's display is actually a translated image of the "real world," it may become necessary for the gesture mapping techniques described herein to translate the location of a user's gesture input from "touch screen space" to "image sensor space" so that the image filtering effect is properly applied to the portion(s) of the captured image data indicated by the user. As shown in FIG. 11, user 202 is holding the device 208 and pointing it back at himself to capture scene 1100 utilizing front-facing camera 250. As shown in scene 1100, the user 202 has centered himself in the scene 1100, as is common behavior in videoconferencing or other self-facing camera applications.

For the sake of illustration, assume that the user 202 has selected an image filter that he would like to be applied to scene 1100, and that his selected image filter requires the coordinates of an input point as its only input parameter. As described above, the location of the user's touch point 1114, may be defined by point 1102 having coordinates x4 and y4. The "touch screen space" in the example of FIG. 11 is illustrated by screen 210 map (1104). As can be understood by comparing the location of touch point 1114 on touch screen 210 and touch point 1108, as represented in touch screen space on screen 210 map (1104), a touch point on the touch screen 210 will always translate to an identical location in touch screen space, no matter what way the device is oriented, or which of the device's camera is currently driving the device's display. As described above, the actual physical location of the touch point within the scene being captured by the image sensor may be unimportant for relative gestures and for image filters where there is not a "focus" or central position to the image filter's effect. However, for absolute gestures, and especially for image filters where there is a "focus" to the image filter's effect, an additional translation between the input point in "touch screen space" and the input point in "sensor space" may be required to be performed by the gesture translation layer before the image filter effect is applied, as is explained further below.

For example, as illustrated in FIG. 11, if the user 202 initiates a single tap gesture in the lower left corner of the touch screen 210, he is actually clicking on a part of the touch screen that corresponds to the location of his right shoulder. In an exemplary image filter responsive to absolute gestures, this may indicate a desire to apply the "focus" of the image filter's effect, e.g., a circular "twirl" effect, to the image sensor data corresponding to the pixels comprising the user's right shoulder. As may be better understood when following trace lines 1112 between touch screen 210 and the sensor 250 map (1106), touch point 1102 in the lower left corner of touch screen 210 translates to the a touch point 1110 in the equivalent location in the lower right corner of sensor 250 map (1106). This is because it is actually the pixels on the right side of the image sensor that correspond to the pixels displayed on the left side of touch screen 210 when the front-facing camera 250 is driving the device's display.

In other embodiments, further translations may be needed to map between touch input points indicated by the user in "touch screen space" and the actual corresponding pixels in "image sensor space." For example, the touch input point may need to be mirrored and then rotated ninety degrees, or the touch input point may need to be rotated 180 degrees to ensure that the image filter's effect is applied to the correct corresponding image sensor data. When properly defined, neither the client application, the user, nor the image filter itself needs to know any details about the translation between "touch screen space" and "image sensor space." All such logic may be carried out by the gesture translation layer, in accordance with an embodiment described herein.

Figure 12:
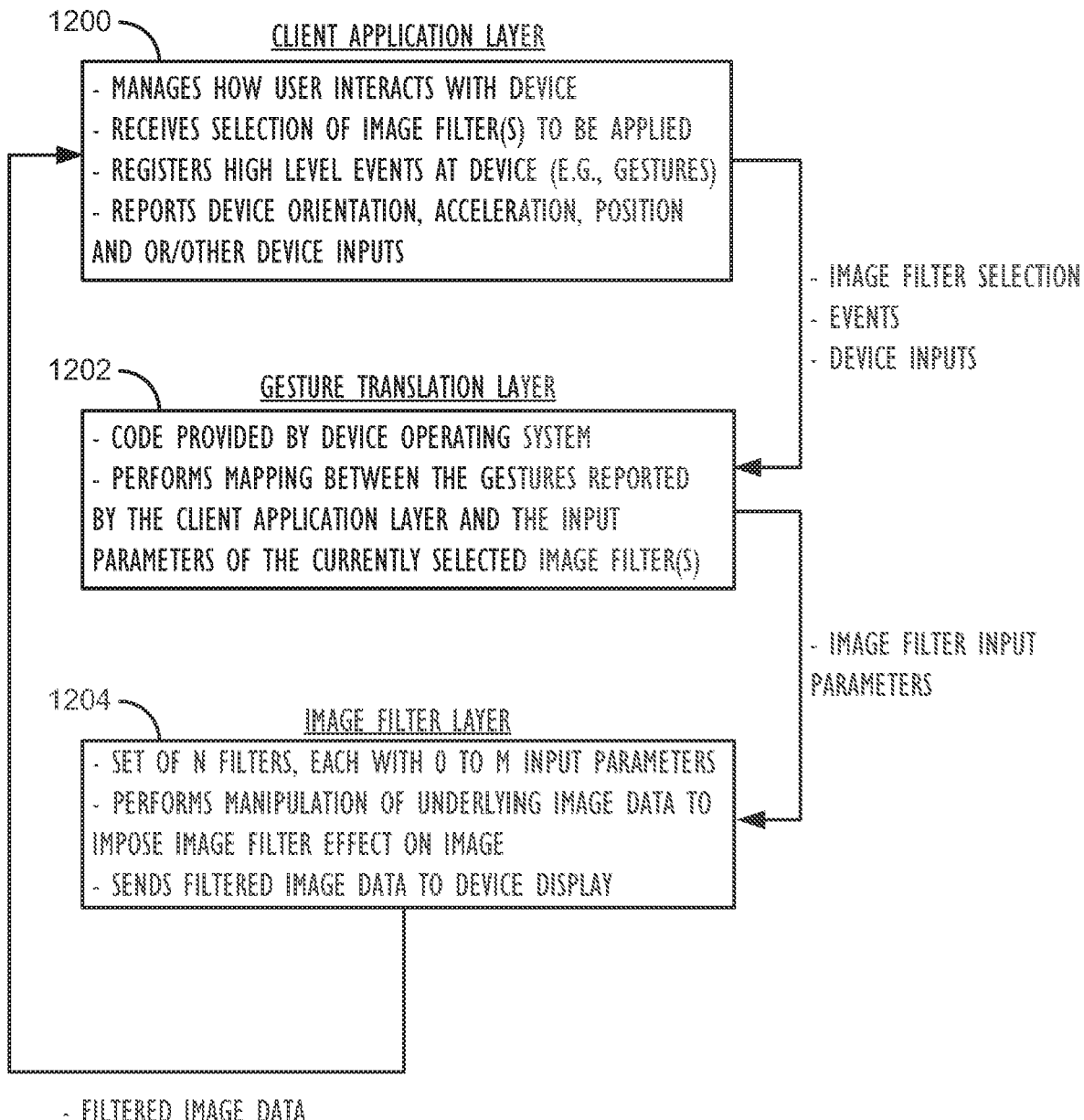
FIG. 12 illustrates a three-tiered programmatic gesture mapping architecture, in accordance with one embodiment.

Referring now to FIG. 12, a three-tiered programmatic gesture mapping architecture is shown, in accordance with one embodiment. First, the Client Application Layer (1200) will be described. The Client Application Layer (1200) may: manage how the user interacts with device; receive the selection of image filter(s) to be applied to the image sensor data; register high level events at device (e.g., gestures); and receive device orientation, acceleration, position and or/other device input. The received image filter selections, events, and device input may then be passed along to the Gesture Translation Layer (1202) provided by, for example, the device's operating system. The Gesture Translation Layer (1202) may: perform mapping between the gestures reported by the client application layer and the input parameters of the currently selected image filter(s). The input parameters determined by the Gesture Translation Layer (1202) may then be passed along to the Image Filter Layer (1204). The Image Filter Layer (1204) may comprise a set of N filters, each having 0 to M input parameters, and it may: perform the actual manipulation of underlying image data to impose image filter effect on image and then send the filtered image data to device display.

Figure 13:
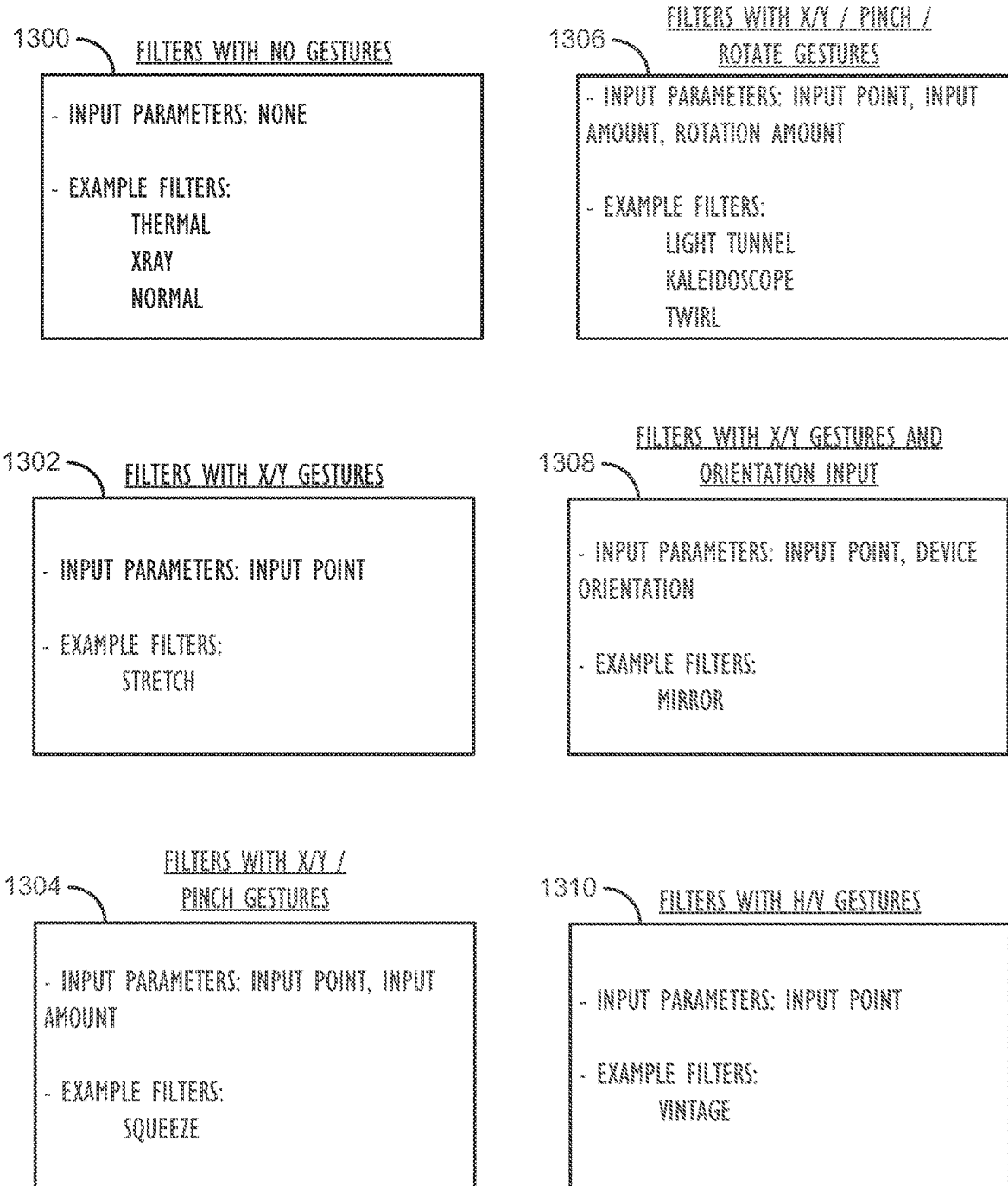
FIG. 13 illustrates various filter types and their corresponding input parameters and exemplary image filters, in accordance with one embodiment.

Referring now to FIG. 13, various exemplary filter types and their corresponding input parameters and exemplary image filters are shown, in accordance with one embodiment. Filters with no gestures (1300) include: Thermal, X-Ray, and Normal. These filters have no input parameters. Next, filters with x/y gestures (1302) include: Stretch. These filters have an input parameter of inputPoint. Next, filters with x/y/pinch gestures (1304) include: Squeeze. These filters have input parameters of inputPoint and inputAmount. Next, filters with x/y/pinch/rotate gestures (1306) include: Light Tunnel, Kaleidoscope, and Twirl. These filters have input parameters of inputPoint and inputAmount, and rotationAmount. Next, filters with x/y gestures and orientation input (1308) include: Mirror. These filters have input parameters of inputPointand deviceOrientation. Next, filters with h/v gestures (1310) include: Vintage. These filters have input parameters of inputPoint.

Figure 14:
FIG. 14 illustrates nine various images filters on the display of a personal electronic device, in accordance with one embodiment.

Referring now to FIG. 14, nine various image filters 1400 on the display of a personal electronic device are shown, in accordance with one embodiment. The upper left rectangle shows the Thermal filter; the upper central rectangle shows the Mirror filter; the upper right rectangle shows the X-ray filter; the middle left rectangle shows the Kaleidoscope filter; the middle central rectangle shows the image with no filtering, i.e., the Normal filter; the middle right rectangle shows the light Tunnel filter; the lower left rectangle shows the Squeeze filter; the lower central rectangle shows the Twirl filter; and the lower right rectangle shows the Stretch filter.

Figure 15:
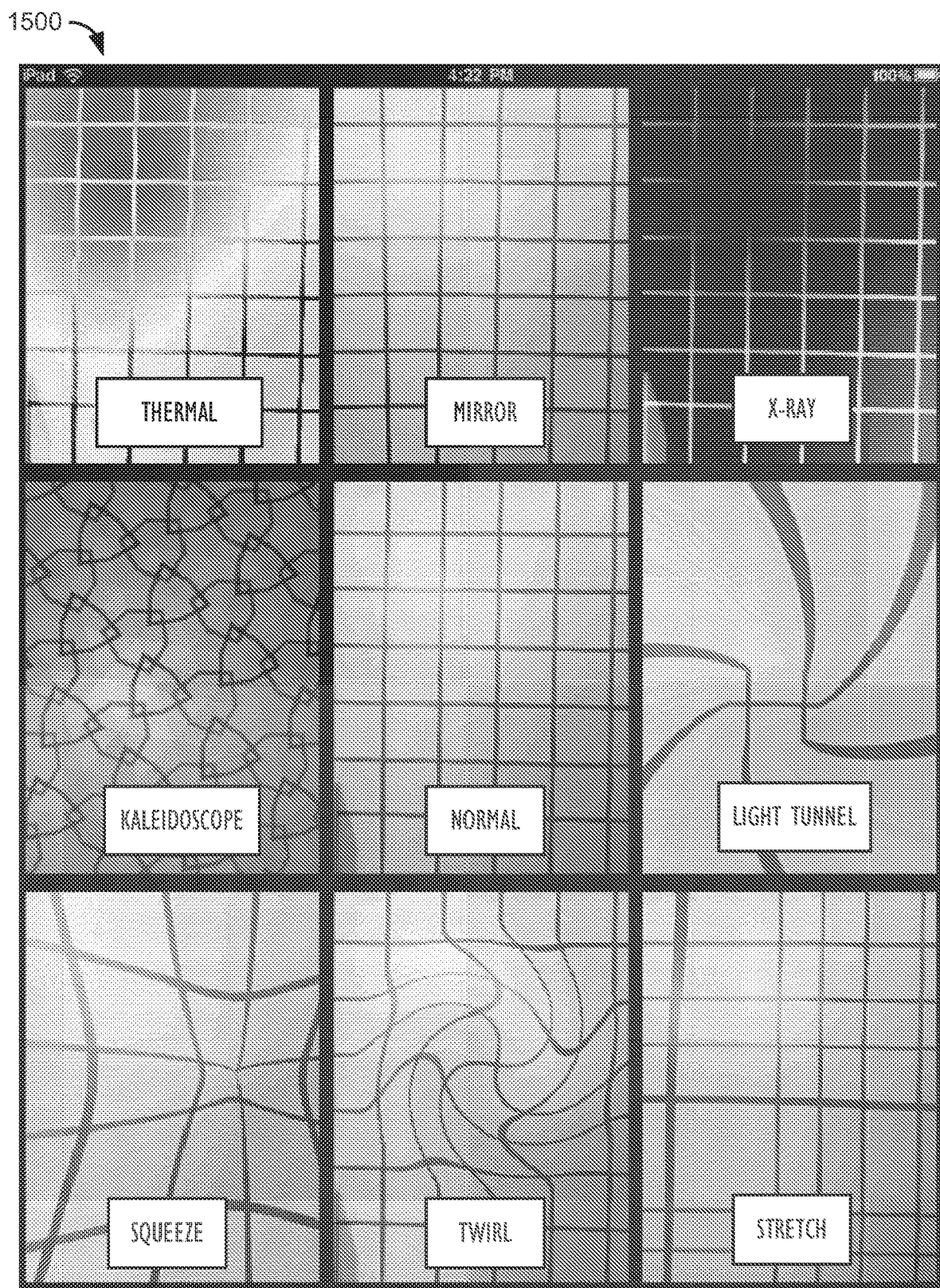
FIG. 15 illustrates grid overlays for the nine image filters of FIG. 14, in accordance with one embodiment.

Referring now to FIG. 15, grid overlays 1500 for the nine image filters of FIG. 14 are shown, in accordance with one embodiment. The upper left rectangle shows the Thermal overlay; the upper central rectangle shows the Mirror overlay; the upper right rectangle shows the X-ray overlay; the middle left rectangle shows the Kaleidoscope overlay; the middle central rectangle shows the image with no overlaid effect, i.e., the Normal overlay; the middle right rectangle shows the Light Tunnel overlay; the lower left rectangle shows the Squeeze overlay; the lower central rectangle shows the Twirl overlay; and the lower right rectangle shows the Stretch overlay.

Figure 16:
FIG. 16 illustrates an image overlay preview grid for a twirl image filter, in accordance with one embodiment.

Referring now to FIG. 16, an image overlay preview grid 1600 for a "twirl" image filter is shown, in accordance with one embodiment. The outer white ring surrounding the subject's face indicates the circumference of the circle of image data that is to be twirled (i.e., filtered). The two filled-in white circles on the perimeter of the white ring are indicative of the user's current finger positions on the display of a display device. In some embodiments, the twirl lines inside the white ring, and the attendant twirled (i.e., filtered) image data within the white ring may serve as a preview to the user of what the captured image will look like before he or she chooses to actually capture the image sensor data and write it to non-volatile memory storage. In other embodiments, the image overlay preview grid may serve as an indication to the user of what types of interactions may be used with the selected image filter (e.g., touch, rotation, resizing, etc.).

Figure 17:
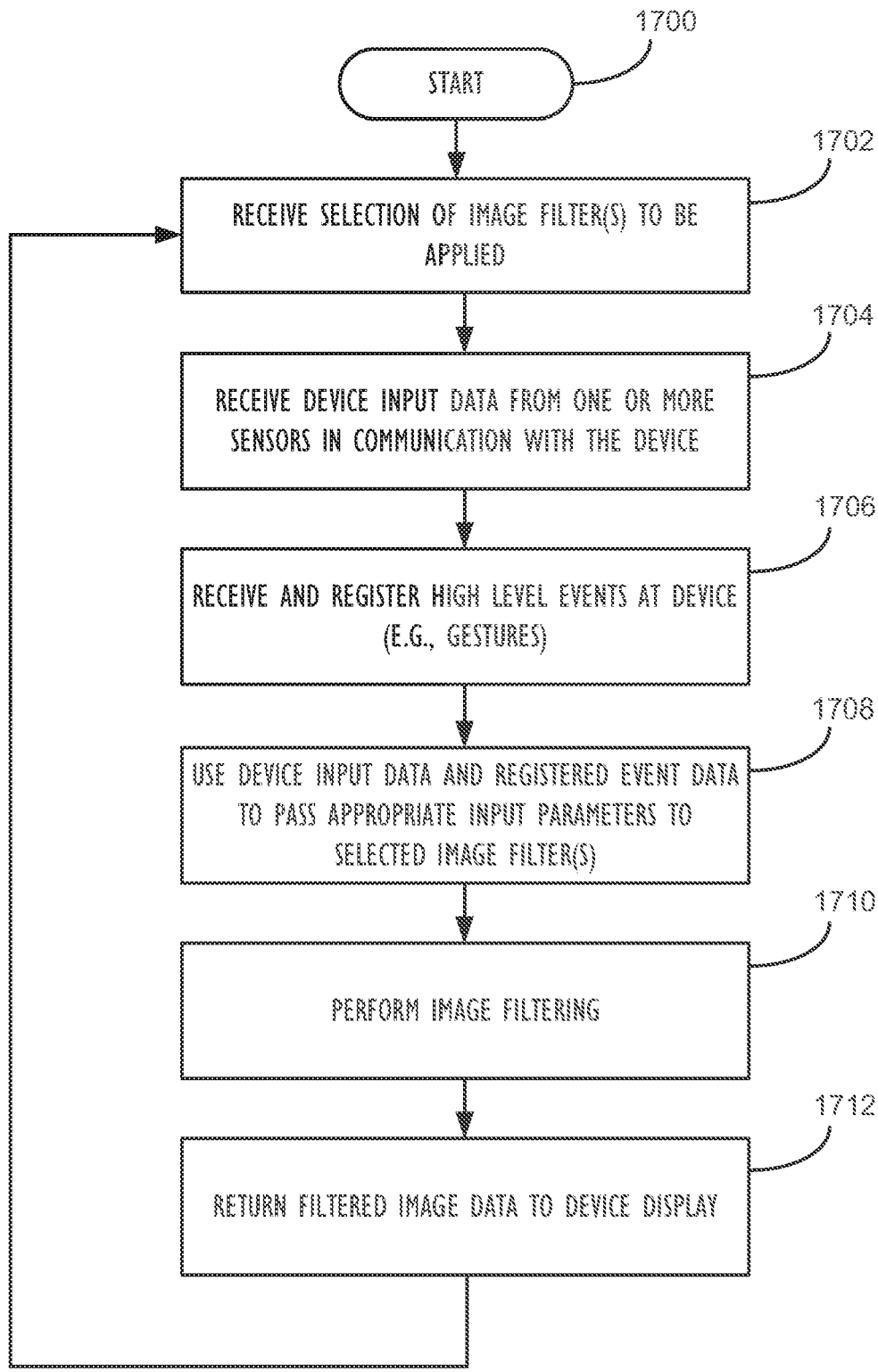
FIG. 17 illustrates, in flowchart form, one embodiment of a process for performing gesture mapping for image filter input parameters.

Referring now to FIG. 17, one embodiment of a process for performing gesture mapping for image filter input parameters is shown in flowchart form. First, the process begins at Step 1700. Next, the process proceeds to receive the selection of image filter(s) to be applied (Step 1702). In some embodiments, a specified gesture, e.g., shaking the device or quickly double tapping the touch screen, may serve as an indication that the user wishes to reset the image filters to their default parameters. Next, the process receives device input data from one or more sensors disposed within or otherwise in communication with the device (e.g., image sensor, orientation sensor, accelerometer, GPS, gyrometer) (Step 1704). Next, the process receives and registers high level events at device (e.g., gestures) (Step 1706). Next, the process uses device input data and registered event data to pass the appropriate input parameters to the selected image filter(s) (Step 1708). Next, the process performs the desired image filtering (Step 1710) and returns the filtered image data to the device's display (Step 1712). In some embodiments, the filtered image data may be returned directly to the client application for additional processing before being displayed on the device's display. In other embodiments, the image filter maybe applied to a previously stored image.

Figure 18:
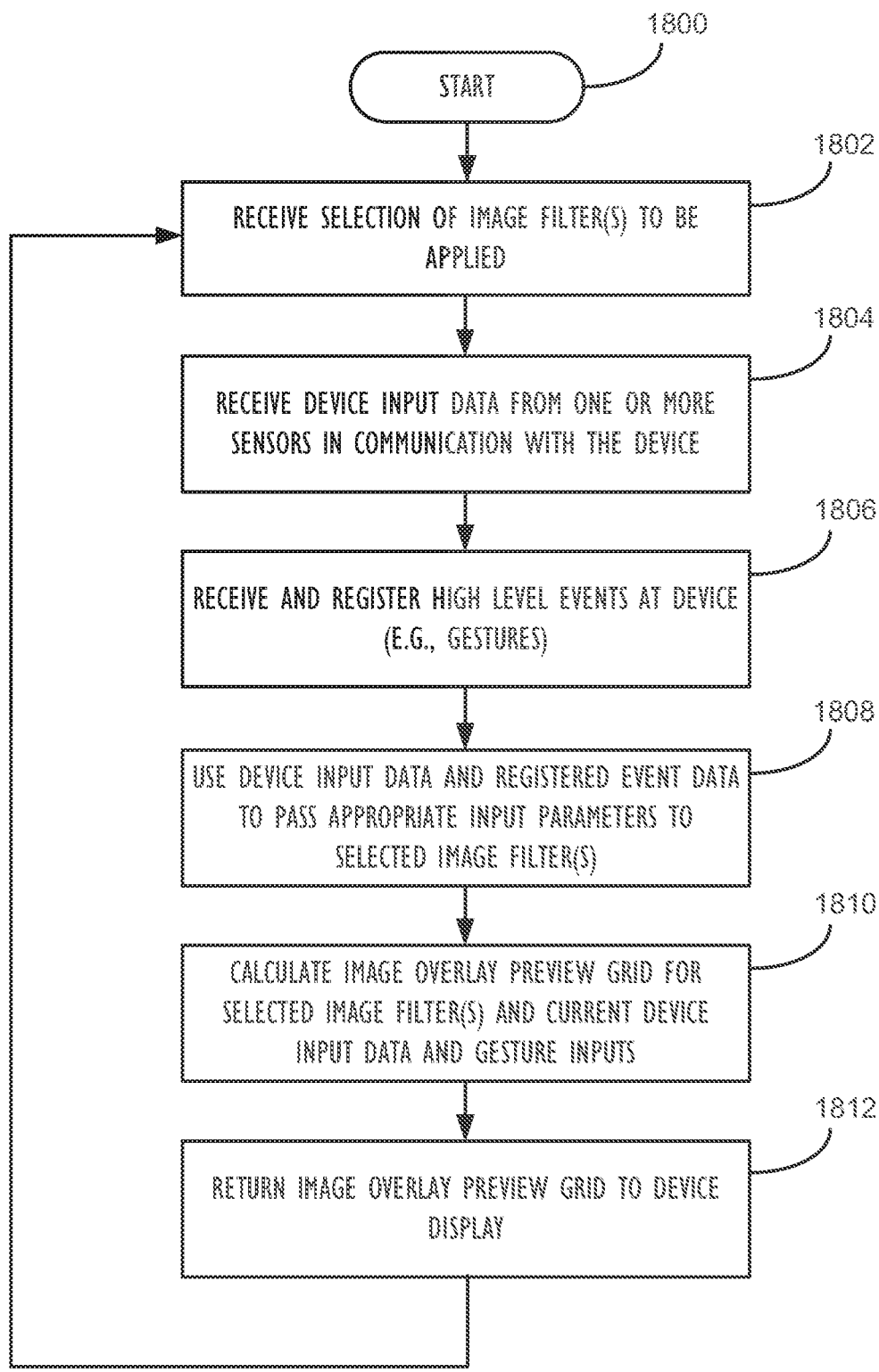
FIG. 18 illustrates, in flowchart form, one embodiment of a process for displaying a grid overlay indicative of gesture mapping for image filter input parameters.

Referring now to FIG. 18, one embodiment of a process for displaying a grid overlay indicative of gesture mapping for image filter input parameters is shown in flowchart form. First, the process begins at Step 1800. Next, the process proceeds to receive the selection of image filter(s) to be applied (Step 1802). Next, the process receives device input data from one or more sensors disposed within or otherwise in communication with the device (e.g., image sensor, orientation sensor, accelerometer, GPS, gyrometer) (Step 1804). Next, the process receives and registers high level events at device (e.g., gestures) (Step 1806). Next, the process uses device input data and registered event data to pass the appropriate input parameters to the selected image filter(s) (Step 1808). Next, the process calculates an image overlay preview grid for the selected image filter(s) and current device input data and gesture inputs (Step 1810). Finally, the process returns the image overlay preview grid to device's display (Step 1812). In some embodiments, the filtered image data may be returned directly to the client application for additional processing before being displayed on the device's display.

Figure 19:
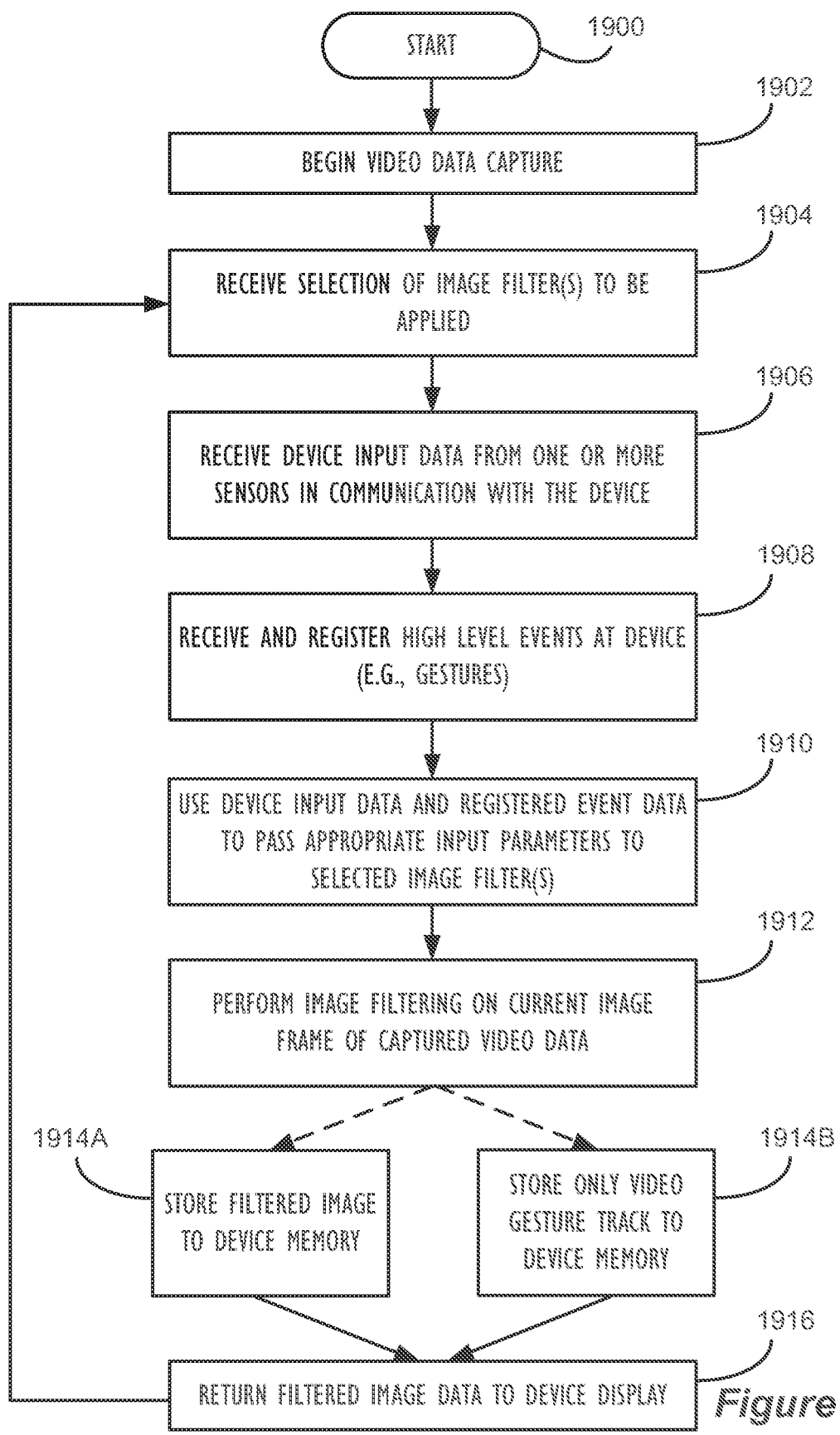
FIG. 19 illustrates, in flowchart form, one embodiment of a process for performing gesture mapping for image filter input parameters during video capture.

Referring now to FIG. 19, one embodiment of a process for performing gesture mapping for image filter input parameters during video capture is shown in flowchart form. First, the process begins at Step 1900. Next, the process proceeds to begin capturing video data with one or more cameras disposed within or otherwise in communication with the device (Step 1902). Next, the process proceeds to receive the selection of image filter(s) to be applied (Step 1904). Next, the process receives device input data from one or more sensors disposed within or otherwise in communication with the device (e.g., image sensor, orientation sensor, accelerometer, GPS, gyrometer) (Step 1906). Next, the process receives and registers high level events at device (e.g., gestures) (Step 1908). Next, the process uses device input data and registered event data to pass the appropriate input parameters to the selected image filter(s) (Step 1910). Next, the process performs the desired image filtering on the current image frame of the captured video data (Step 1912). At this point, the process may either: store the filtered image directly into non-volatile memory (essentially rendering and storing the fully-filtered video stream in near-real time) (Step 1914A) or, if bandwidth or processing power is of concern, the process may simply store the values of the various selected image filters and their input parameters as they varied over time during the video stream (referred to as the video "gesture track") to the device's memory so that the complete, rendered and filtered video stream may be reconstructed at a later time to reflect exactly the image filter input parameters as the user varied them over time during the original capturing of the video stream (Step 1914B). Finally, the process returns the filtered image data to the device's display (Step 1916). In some embodiments, the filtered image data may be returned directly to the client application for additional processing before being displayed on the device's display. In other embodiments, even if the "gesture track" approach is employed, a lower resolution version of the filtered image may still be rendered and displayed on the device's preview screen in near-real time.

Figure 20:
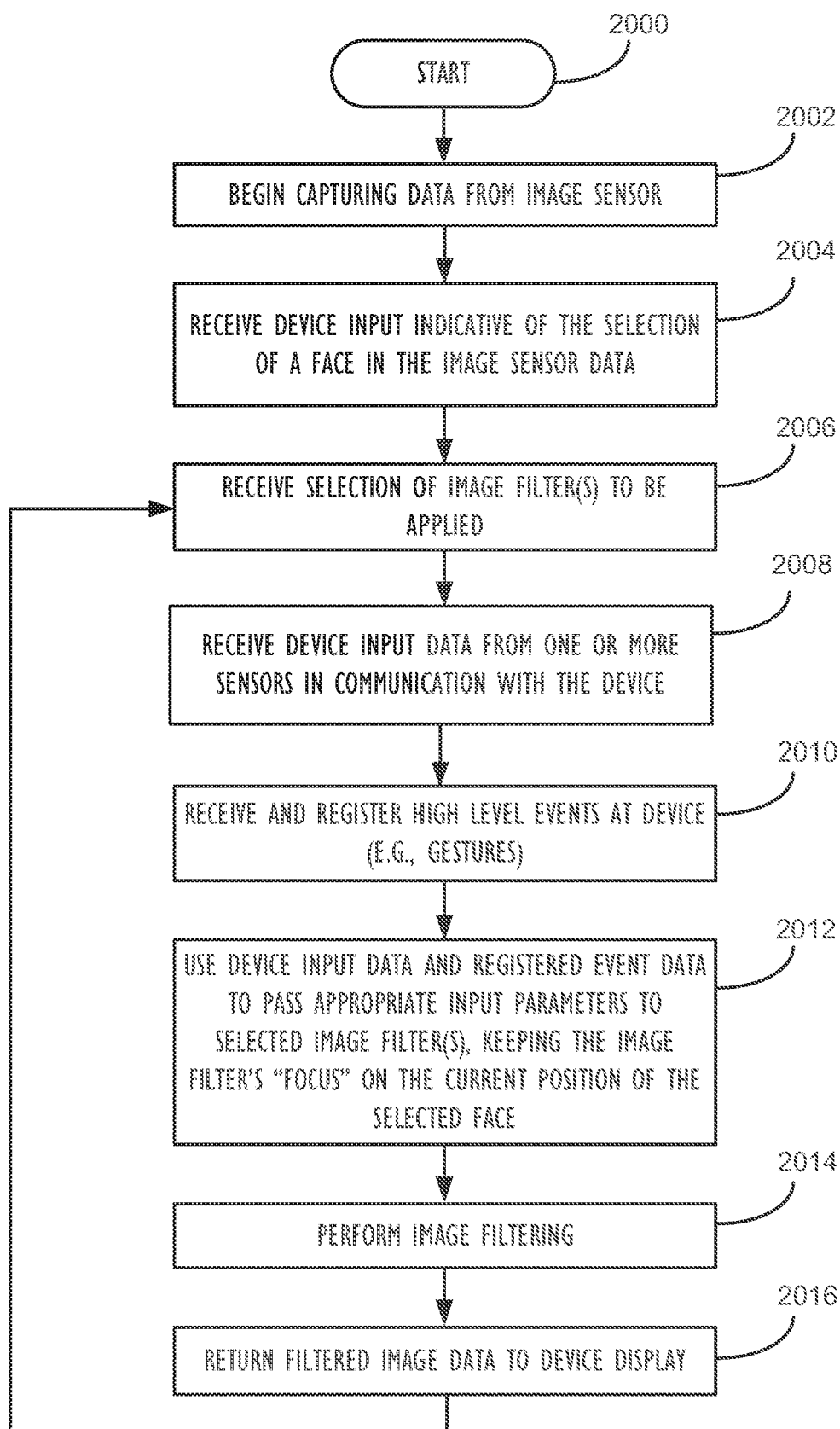
FIG. 20 illustrates, in flowchart form, one embodiment of a process for performing facial detection in conjunction with gesture mapping for image filter input parameters.

Referring now to FIG. 20, one embodiment of a process for performing facial detection in conjunction with gesture mapping for image filter input parameters is shown in flowchart form. First, the process begins at Step 2000. Next, the process proceeds to begin capturing data from one or more image sensors disposed within or otherwise in communication with the device (Step 2002). Next, the process may receive device input indicative of the selection of a face in the image sensor data (Step 2004). It should be noted that, if, at Step 2004, it is determined (through the application of a sufficiently robust facial detection algorithm) that the device input selection is not in fact indicative of a face, the process of FIG. 20 may exit and proceed to Step 1802 of FIG. 18. Next, the process may receive the selection of image filter(s) to be applied (Step 2006). Next, the process may receive device input data from one or more sensors disposed within or otherwise in communication with the device (e.g., image sensor, orientation sensor, accelerometer, GPS, gyrometer) (Step 2008). Next, the process receives and registers high level events at the device (e.g., gestures) (Step 2010). Next, the process uses device input data and registered event data to pass the appropriate input parameters to the selected image filter(s), keeping the image filter's "focus" on the current position of the selected face (Step 2012). Various techniques regarding the real-time tracking of detected faces in captured image sensor data are described in commonly-assigned U.S. application Ser. No. 12/755, 542, entitled, "Dynamic Exposure Metering Based on Face Detection," filed on Apr. 7, 2010, which application is hereby incorporated by reference in its entirety. In some embodiments, the process may maintain the focus of the image filter upon the currently selected face so long as the currently selected face remains in the captured image sensor data. Upon the selected face leaving the captured image sensor data, the process may return to Step 2004 and wait to again receive device input indicative of the selection of a face in the image sensor data. Finally, the process performs the desired image filtering on the selected portion of the image sensor data (Step 2014) and returns the filtered image data to the device's display (Step 2016). In some embodiments, the filtered image data may be returned directly to the client application for additional processing before being displayed on the device's display. In other embodiments, a lower resolution version of the filtered image may be rendered and displayed on the device's preview screen in near-real time.

Figure 21:
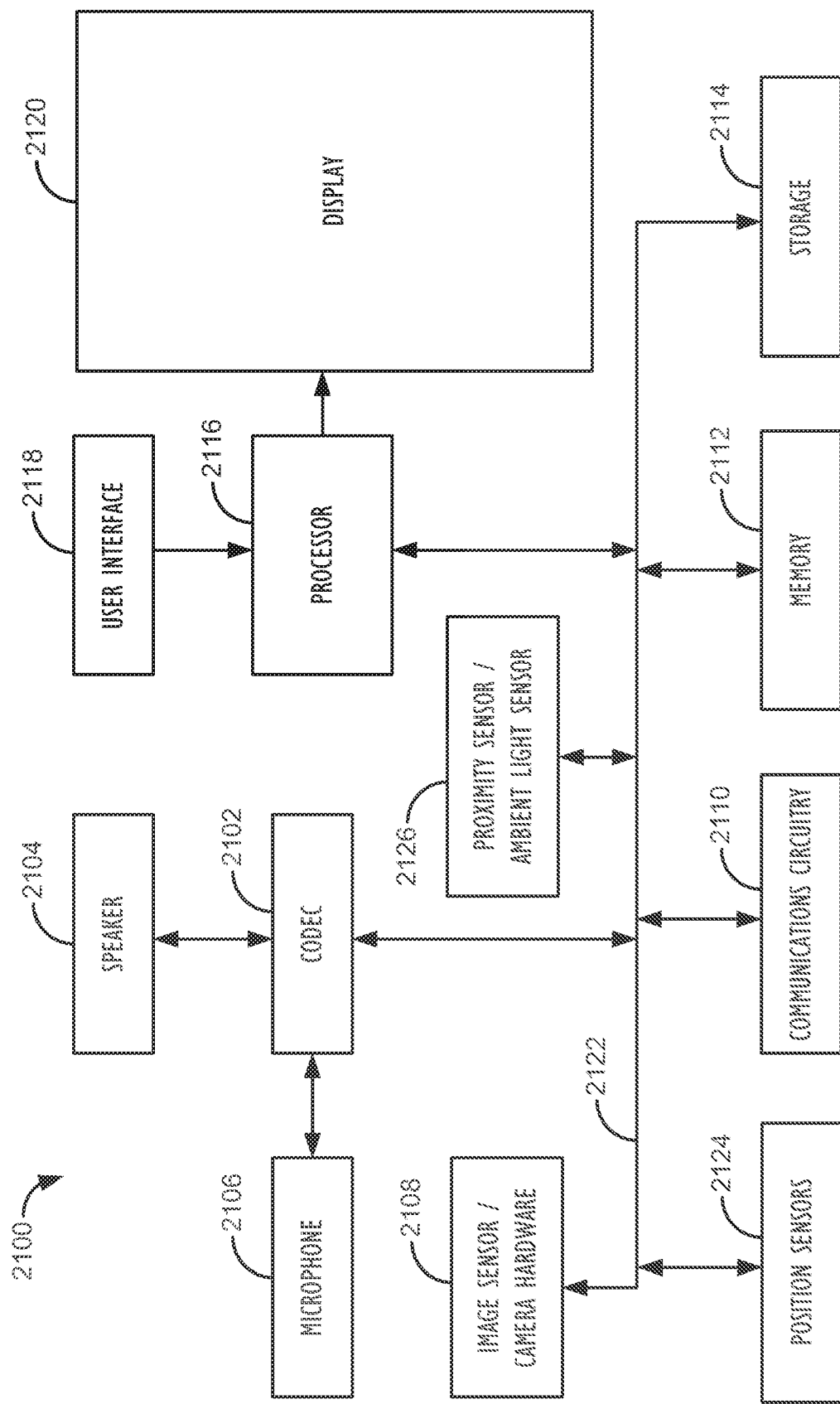
FIG. 21 illustrates a simplified functional block diagram of a device possessing a display, in accordance with one embodiment.

Referring now to FIG. 21, a simplified functional block diagram of a representative electronic device possessing a display 2100 according to an illustrative embodiment, e.g., camera device 208, is shown. The electronic device 2100 may include a processor 2116, display 2120, proximity sensor/ambient light sensor 2126, microphone 2106, audio/video codecs 2102, speaker 2104, communications circuitry 2110, position sensors 2124, image sensor with associated camera hardware 2108, user interface 2118, memory 2112, storage device 2114, and communications bus 2122. Processor 2116 may be any suitable programmable control device and may control the operation of many functions, such as the mapping of gestures to image filter input parameters, as well as other functions performed by electronic device 2100. Processor 2116 may drive display 2120 and may receive user inputs from the user interface 2118. An embedded processor, such a Cortex® A8 with the ARM® v7-A architecture, provides a versatile and robust programmable control device that may be utilized for carrying out the disclosed techniques. (CORTEX® and ARM® are registered trademarks of the ARM Limited Company of the United Kingdom.)

Storage device 2114 may store media (e.g., image and video files), software (e.g., for implementing various functions on device 2100), preference information, device profile information, and any other suitable data. Storage device 2114 may include one more storage mediums, including for example, a hard-drive, permanent memory such as ROM, semi-permanent memory such as RAM, or cache.

Memory 2112 may include one or more different types of memory which may be used for performing device functions. For example, memory 2112 may include cache, ROM, and/or RAM. Communications bus 2122 may provide a data transfer path for transferring data to, from, or between at least storage device 2114, memory 2112, and processor 2116. User interface 2118 may allow a user to interact with the electronic device 2100. For example, the user input device 2118 can take a variety of forms, such as a button, keypad, dial, a click wheel, or a touch screen.

In one embodiment, the personal electronic device 2100 may be a electronic device capable of processing and displaying media such as image and video files. For example, the personal electronic device 2100 may be a device such as such a mobile phone, personal data assistant (PDA), portable music player, monitor, television, laptop, desktop, and tablet computer, or other suitable personal device.

The foregoing description of preferred and other embodiments is not intended to limit or restrict the scope or applicability of the inventive concepts conceived of by the Applicants. As one example, although the present disclosure focused on touch screen display screens, it will be appreciated that the teachings of the present disclosure can be applied to other implementations, such as stylus-operated display screens. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An image processing method, comprising:
   obtaining, by an electronic device, an image using a camera;
   displaying, by the electronic device, the image to a touchscreen display;
   receiving, by the electronic device, a user selection of a particular location of the image using the touchscreen display to reveal a graphical control on the display;
   in response to receiving the selection of the particular location, revealing, by the electronic device, the graphical control for adjusting a first parameter of the image by at least:
      displaying a range indicator that represents a range of values selectable for the first parameter positioned according to: (a) the particular location, and (b) a current value of the first parameter within the range of values; and
      displaying a current setting indicator, initially positioned at the particular location upon the range indicator, that represents the current value of the first parameter within the range of values;
   receiving, by the electronic device, motion input to the range indicator;
   in response to receiving the motion input:
      moving, by the electronic device, the current setting indicator along the range indicator to a current location of the motion input while keeping the range indicator stationary; and
      adjusting, by the electronic device, the first parameter of the image based on the motion input to produce an adjusted image; and
   storing, by the electronic device, the adjusted image in a memory.

2. The method of claim 1, wherein the first parameter is selected from a group comprising: hue, contrast, exposure, and brightness.

3. The method of claim 1, wherein the motion input to the range indicator is received via the touchscreen display.

4. The method of claim 1, wherein an amount of change that the first parameter is adjusted is relative to an amount of change of the current setting indicator along the range indicator due to the motion input.

5. The method of claim 1, further comprising:
   receiving, by the electronic device, a selection of the first parameter to adjust.

6. The method of claim 5, wherein the image obtained by the camera is a video stream of images, and wherein receiving the selection of the first parameter to adjust further comprises receiving, by the electronic device, a selection of an image frame of the video stream of images.

7. The method of claim 1, wherein the first parameter is contrast, wherein the contrast of the image is increased in response to movement of the current setting indicator along the range indicator in a rightward direction, and wherein the contrast of the image is decreased in response to movement of the current setting indicator along the range indicator in a leftward direction.

8. An apparatus comprising:
   an image sensor for capturing an image;
   a touchscreen display;
   a memory in communication with the image sensor; and
   a programmable control device communicatively coupled to the image sensor, the touchscreen display, and the memory, wherein the memory includes instructions for causing the programmable control device to perform operations comprising:
      obtaining an image using the image sensor;
      displaying the image to the touchscreen display;
      receiving, via the touchscreen display, a user selection of a particular location of the image to produce a range indicator on the display;
      in response to receiving the selection of the particular location, revealing, by the electronic device, the graphical control for adjusting a first parameter of the image by at least:
         displaying a range indicator that represents a range of values selectable for the first parameter positioned according to: (a) the particular location, and (b) a current value of the first parameter within the range of values; and
         displaying a current setting indicator, initially positioned at the particular location upon the range indicator, that represents the current value of the first parameter within the range of values;
      receiving motion input to the range indicator;
      in response to receiving the motion input:
         moving the current setting indicator along the range indicator to a current location of the motion input while keeping the range indicator stationary; and
         adjusting the first parameter of the image based on the motion input to produce an adjusted image; and
      storing the adjusted image in a memory.

9. The apparatus of claim 8, wherein the first parameter is selected from a group comprising: hue, contrast, exposure, and brightness.

10. The apparatus of claim 8, wherein the motion input to the range indicator is received via the touchscreen display.

11. The apparatus of claim 8, wherein an amount of change that the first parameter is adjusted is relative to an amount of change of the current setting indicator along the range indicator due to the motion input.

12. The apparatus of claim 8, wherein the operations include:

receiving a selection of the first parameter to adjust.

13. The apparatus of claim 12, wherein the image obtained by the image sensor is a video stream of images, and wherein receiving the selection of the first parameter to adjust further comprises receiving a selection of an image frame of the video stream of images.

14. The apparatus of claim 8, wherein the first parameter is contrast, wherein the contrast of the image is increased in response to movement of the current setting indicator along the range indicator in a rightward direction, and wherein the contrast of the image is decreased in response to movement of the current setting indicator along the range indicator in a leftward direction.

15. A non-transitory computer readable storage medium including computer readable program code stored thereon, wherein the computer readable program code, when executed by an electronic device having one or more processors, causes the electronic device to perform operations comprising:

obtaining, by the electronic device, an image using a camera;

displaying, by the electronic device, the image to a touchscreen display;

receiving, by the electronic device, a user selection of a particular location of the image using the touchscreen display to produce a range indicator on the display;

in response to receiving the selection of the particular location, revealing, by the electronic device, the graphical control for adjusting a first parameter of the image by at least:

displaying a range indicator that represents a range of values selectable for the first parameter positioned according to: (a) the particular location, and (b) a current value of the first parameter within the range of values; and displaying a current setting indicator, initially positioned at the particular location upon the range indicator, that represents the current value of the first parameter within the range of values;

receiving, by the electronic device, motion input to the range indicator;

in response to receiving the motion input:

moving, by the electronic device, the current setting indicator along the range indicator to a current location of the motion input while keeping the range indicator stationary; and adjusting, by the electronic device, the first parameter of the image based on the motion input to produce an adjusted image; and storing, by the electronic device, the adjusted image in a memory.

16. The non-transitory computer readable storage medium of claim 15, wherein the first parameter is selected from a group comprising: hue, contrast, exposure, and brightness.

17. The non-transitory computer readable storage medium of claim 15, wherein the motion input to the range indicator is received via the touchscreen display.

18. The non-transitory computer readable storage medium of claim 15, wherein an amount of change that the first parameter is adjusted is relative to an amount of change of the current setting indicator along the range indicator due to the motion input.

19. The non-transitory computer readable storage medium of claim 15, wherein the operations include:

receiving, by the electronic device, a selection of the first parameter to adjust, wherein the image obtained by the camera is a video stream of images, and wherein receiving the selection of the first parameter to adjust further comprises receiving, by the electronic device, a selection of an image frame of the video stream of images.

20. The non-transitory computer readable storage medium of claim 15, wherein the first parameter is contrast, wherein the contrast of the image is increased in response to movement of the current setting indicator along the range indicator in a rightward direction, and wherein the contrast of the image is decreased in response to movement of the current setting indicator along the range indicator in a leftward direction.

* * * * *